(12) United States Patent
Oshita et al.

(10) Patent No.: US 8,039,071 B2
(45) Date of Patent: *Oct. 18, 2011

(54) GAS BARRIER LAYERED PRODUCT AND PACKAGING MEDIUM, AND METHOD FOR PRODUCING GAS BARRIER LAYERED PRODUCT

(75) Inventors: Tatsuya Oshita, Kurashiki (JP); Goki Uehara, Kurashiki (JP); Atsuhiro Nakahara, Kurashiki (JP); Osamu Kazeto, Kurashiki (JP); Manabu Shibata, Kurashiki (JP); Takehiro Miyamoto, Ogaki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,485

(22) Filed: Apr. 27, 2010

(65) Prior Publication Data

US 2010/0209639 A1    Aug. 19, 2010

Related U.S. Application Data

(63) Continuation of application No. 10/581,448, filed as application No. PCT/JP2004/017874 on Dec. 1, 2004, now Pat. No. 7,763,335.

(30) Foreign Application Priority Data

Dec. 3, 2003 (JP) ................. 2003-403891
Aug. 13, 2004 (JP) ................. 2004-235697

(51) Int. Cl.
| | |
|---|---|
| B32B 27/10 | (2006.01) |
| B32B 27/08 | (2006.01) |
| B32B 9/04 | (2006.01) |
| B32B 29/00 | (2006.01) |
| B05D 3/10 | (2006.01) |
| B05D 3/02 | (2006.01) |
| C08K 5/54 | (2006.01) |

(52) U.S. Cl. ... 428/35.2; 428/35.7; 428/446; 428/537.5; 427/337; 427/391; 524/188; 524/261

(58) Field of Classification Search ................ 428/34.1, 428/34.2, 35.7, 411.1, 537.5, 34.3; 427/331, 427/372.2, 395, 541, 337; 229/162.1; 524/188, 524/261

See application file for complete search history.

(56) References Cited

U.S. PATENT DOCUMENTS

| | | | |
|---|---|---|---|
| 5,725,958 | A | 3/1998 | Matsuda et al. |
| 6,596,807 | B2 | 7/2003 | Oshita et al. |
| 2002/0048680 | A1 | 4/2002 | Yamanaka |
| 2005/0131162 | A1 | 6/2005 | Tanaka et al. |
| 2007/0111005 | A1 | 5/2007 | Oshita et al. |
| 2009/0030126 | A1 | 1/2009 | Uehara et al. |
| 2009/0297741 | A1 | 12/2009 | Oshita et al. |

FOREIGN PATENT DOCUMENTS

| | | |
|---|---|---|
| EP | 0 240 571 A1 | 10/1987 |
| JP | 57-030745 | 6/1982 |
| JP | 62-094834 | 6/1987 |
| JP | 62-158677 | 7/1987 |
| JP | 7 118543 | 5/1995 |
| JP | 7-308994 | 11/1995 |
| JP | 8-099390 | 4/1996 |
| JP | 9-239911 | 9/1997 |
| JP | 9-262943 | 10/1997 |
| JP | 10-122477 | 5/1998 |
| JP | 10-194273 | 7/1998 |
| JP | 10 237180 | 9/1998 |
| JP | 10-244613 | 9/1998 |
| JP | 11-129380 | 5/1999 |
| JP | 11-508502 | 7/1999 |
| JP | 11-227752 | 8/1999 |
| JP | 11-256094 | 9/1999 |
| JP | 11-257574 | 9/1999 |
| JP | 2000 233478 | 8/2000 |
| JP | 2001-328681 | 11/2001 |
| JP | 2002-138109 | 5/2002 |
| JP | 2002-294153 | 10/2002 |
| JP | 2002-302150 | * 10/2002 |
| JP | 2002 326303 | 11/2002 |
| JP | 2003-54537 | 2/2003 |
| JP | 2003-112719 | 4/2003 |
| JP | 2003-191364 | 7/2003 |
| JP | 2003 292713 | 10/2003 |
| JP | 2004-314563 | 11/2004 |
| JP | 2005-8160 | 1/2005 |
| JP | 2005-40489 | 2/2005 |
| WO | WO 97/02140 | 1/1997 |
| WO | WO 03/091317 A1 | 11/2003 |

OTHER PUBLICATIONS

Machine Translation of JP 2002-302150 Oct. 2002.* JP2003-292713, Oct. 15, 2003 with certified partial English Translation.
Machine Translation of JP 2002-326303 Aug. 23, 2002.
Machine Translation of JP 2003-292713 Oct. 15, 2003.

* cited by examiner

*Primary Examiner* — Rena Dye
*Assistant Examiner* — Erik Kashnikow
(74) *Attorney, Agent, or Firm* — Oblon, Spivak, McClelland, Maier & Neustadt, L.L.P.

(57) ABSTRACT

Provided is a gas barrier layered product including a base material and a layer stacked on at least one surface of the base material, wherein the layer is formed of a composition including: a hydrolyzed and condensed product of at least one compound (L) containing a metal atom to which at least one characteristic group selected from a halogen atom and an alkoxy group has been bonded, wherein the compound (L) contains at least one compound (A) and at least one compound (B), wherein a mole ratio of the compound (A) / the compound (B) is in a range of 0.5/99.5 to 40/60; and a neutralized product of a polymer containing at least one functional group selected from a carboxyl group and a carboxylic anhydride group, wherein at least 55 mol % of a —COO— group contained in the at least one functional group has been neutralized with a metal ion having a valence of two or more. Also provided is a method for producing the gas barrier layered product.

24 Claims, No Drawings

GAS BARRIER LAYERED PRODUCT AND PACKAGING MEDIUM, AND METHOD FOR PRODUCING GAS BARRIER LAYERED PRODUCT

CROSS-REFERENCE TO RELATED APPLICATIONS

The present application is a continuation of U.S. patent application Ser. No. 10/581,448, filed on Jun. 1, 2006, which is a 35 U.S.C. §371 National Stage patent application of International patent application PCT/JP2004/017874, filed on Dec. 1, 2004, which claims priority to Japanese patent applications JP 2004-235697, filed on Aug. 13, 2004, and JP 2003-403891, filed on Dec. 3, 2003, all of which are incorporated herein by reference in their entireties.

TECHNICAL FIELD

The present invention relates to a gas barrier layered product and a packaging medium as well as a method for producing a gas barrier layered product.

BACKGROUND ART

Materials for packaging foods and various articles often are required to have a gas barrier property, particularly, an oxygen barrier property. This is intended to preclude effects such as oxidation degradation of packaged contents that is caused due to oxygen, for example. Particularly, with respect to food packages, the presence of oxygen allows microorganisms to proliferate and thereby the contents decays, which is a problem. Hence, in conventional packaging materials, gas barrier layers that prevent oxygen from permeating therethrough are provided, so that the permeation of oxygen is prevented, for example.

Such a gas barrier layer can be, for example, a vapor deposition layer of metallic foil, metal, or a metal compound. Generally, aluminum foil, an aluminum vapor deposition layer, a silicon oxide vapor deposition layer, an aluminum oxide vapor deposition layer, etc. are used. However, metal layers such as the aluminum vapor deposition layer and aluminum foil have disadvantages in that the packaged contents cannot be seen or disposability is low, for example. Furthermore, metal compound layers such as the silicon oxide vapor deposition layer and the aluminum oxide vapor deposition layer have disadvantages in that the gas barrier property thereof is degraded considerably when the packaging material is deformed, dropped, or subjected to an impact during transportation, for example.

Moreover, a layer formed of a vinyl-alcohol-based polymer that is excellent in gas barrier property may be used as a gas barrier layer in some cases. Examples of the vinyl-alcohol-based polymer include polyvinyl alcohol, an ethylene-vinyl alcohol copolymer, etc. Such a layer formed of a vinyl-alcohol-based polymer has advantages in being transparent and having less difficulty in disposal. Accordingly, the range of uses thereof is increasing.

The above-mentioned vinyl-alcohol-based polymer is crystallized through hydrogen bonds by which hydroxyl groups contained in the molecules thereof are bonded to each other, and thereby exhibits the gas barrier property. Hence, the conventional vinyl-alcohol-based polymer exhibits a high gas barrier property in a dry state. However, in a state where it has absorbed moisture due to, for instance, water vapor, the hydrogen bonds are loosened and thereby the gas barrier property thereof tends to deteriorate. Accordingly, it is difficult to allow a vinyl-alcohol-based polymer such as polyvinyl alcohol to exhibit a high level of gas barrier property under a high humidity condition.

Moreover, materials containing a polymer compound and a hydrolyzed and condensed product of metal alkoxide (for instance, tetramethoxysilane) have been studied as materials with a gas barrier property (for example, JP2002-326303A, JP7(1995)-118543A, and JP2000-233478A).

Recently, retort foods are being produced increasingly. The retort foods are produced by packing contents in a food packaging material and then immersing it in hot water to subject it to a sterilization treatment. In such a situation, the level of performance that is required of packaging materials for retort foods further is increasing. Examples of the performance include a high bag breaking strength when a food packaging material including contents packed therein is dropped, an oxygen barrier property after it is sterilized in hot water, an oxygen barrier property under a high humidity condition until it is delivered to a consumer, etc. Particularly, there is demand for packaging materials that exhibit a high oxygen barrier property regardless of humidity, exhibit a high oxygen barrier property even after being subjected to retort processing, and are excellent in strength and transparency. The above-mentioned conventional techniques, however, cannot satisfy such demands well.

DISCLOSURE OF INVENTION

With such a situation in mind, one of the objects of the present invention is to provide a gas barrier layered product that exhibits a high oxygen barrier property regardless of humidity, exhibits a high oxygen barrier property even after being subjected to retort processing, and is excellent in strength and transparency. Furthermore, another object of the present invention is to provide a method that allows such a gas barrier layered product to be manufactured industrially advantageously.

The present inventors made keen studies assiduously to achieve the above-mentioned objects. As a result, they found out the following. That is, when a layered product including, as a gas barrier layer, a layer formed of a composition that contains: a hydrolyzed and condensed product of metal alkoxide; and a polymer containing at least one functional group selected from a carboxyl group and a carboxylic anhydride group is immersed in a solution containing a metal ion with a valence of two or more and thereby the above-mentioned functional group contained in the polymer is neutralized, the characteristics of the layer formed of the above-mentioned composition improve dramatically. Then further studies were made. As a result, the present invention was completed.

That is, a gas barrier layered product of the present invention includes a base material and a layer stacked on at least one surface of the base material. The layer is formed of a composition that includes: a hydrolyzed and condensed product of at least one compound (L) containing a metal atom to which at least one characteristic group selected from a halogen atom and an alkoxy group has been bonded; and a neutralized product of a polymer containing at least one functional group selected from a carboxyl group and a carboxylic anhydride group. At least a part of the —COO— group contained in the at least one functional group has been neutralized with a metal ion having a valence of two or more.

A packaging medium of the present invention is one in which the above-mentioned gas barrier layered product of the present invention is used.

Furthermore, a method of the present invention for producing a gas barrier layered product is characterized by including: a first process of forming a layer made of a composition on a base material; and a second process of bringing the layer into contact with a solution containing a metal ion with a valence of two or more. The composition includes: a hydrolyzed and condensed product of at least one compound (L) containing a metal atom to which at least one characteristic group selected from a halogen atom and an alkoxy group has been bonded; and a polymer containing at least one functional group selected from a carboxyl group and a carboxylic anhydride group.

The present invention makes it possible to obtain a gas barrier layered product that exhibits a high oxygen barrier property regardless of humidity, exhibits a high oxygen barrier property even after being subjected to retort processing, and is excellent in strength and transparency. It is possible for the gas barrier layered product of the present invention to have an oxygen transmission rate of 1.0 cm$^3$/m$^2$·day·atm or lower in an atmosphere of 20° C. and 85% RH. This gas barrier layered product can be produced industrially easily by the production method of the present invention. The gas barrier layered product is used effectively for packaging materials for foods, medicine, medical equipment, machine parts, and garments, for example. Above all, it is used particularly effectively for food packaging in which a gas barrier property is required to be obtained under a high humidity condition.

DESCRIPTION OF THE INVENTION

Embodiments of the present invention are described below. In the following descriptions, specific compounds may be indicated as examples of the substances that exhibit specific functions. The present invention, however, is not limited thereto. Furthermore, materials that are indicated as examples can be used individually or in combination unless otherwise specified.

Gas Barrier Layered Product

The gas barrier layered product of the present invention includes a base material and a layer stacked on at least one surface of the base material. The layer (hereinafter also referred to as a "gas barrier layer" in some cases) is formed of a composition that includes: a hydrolyzed and condensed product of at least one compound (L) containing a metal atom to which at least one characteristic group (atomic group) selected from a halogen atom and an alkoxy group has been bonded; and a neutralized product of a polymer containing at least one functional group selected from a carboxyl group and a carboxylic anhydride group. At least a part of the —COO— group contained in the at least one functional group has been neutralized with a metal ion having a valence of two or more. In other words, at least a part of the at least one functional group and a metal ion with a valence of two or more compose salt.

Hydrolyzed and Condensed Product

For the compound (L), at least one of the compound (A) and/or the compound (B) that are described below can be used. The compound (A) and the compound (B) are described as follows.

The compound (A) is at least one compound that is expressed by the following chemical formula (I):

$$M^1(OR^1)_n X^1_k Z^1_{m-n-k} \qquad (I).$$

In the chemical formula (I), M$^1$ denotes an atom selected from Si, Al, Ti, Zr, Cu, Ca, Sr, Ba, Zn, B, Ga, Y, Ge, Pb, P, Sb, V, Ta, W, La, and Nd. M$^1$ is preferably Si, Al, Ti, or Zr, particularly preferably Si. In the chemical formula (I), R$^1$ indicates an alkyl group such as a methyl group, an ethyl group, an n-propyl group, an iso-propyl group, an n-butyl group, a t-butyl group, etc. and is preferably a methyl group or an ethyl group. Furthermore, in the chemical formula (I), X$^1$ indicates a halogen atom. Examples of the halogen atom that is indicated by X$^1$ include a chlorine atom, a bromine atom, an iodine atom, etc. but a chlorine atom is preferable. In the chemical formula (I), Z$^1$ denotes an alkyl group substituted by a functional group having reactivity to a carboxyl group. In this case, examples of the functional group having reactivity to a carboxyl group include an epoxy group, an amino group, a hydroxyl group, a halogen atom, a mercapto group, an isocyanate group, a ureide group, an oxazoline group, and a carbodiimide group. Among them, an epoxy group, an amino group, an isocyanate group, a ureide group, or a halogen atom is preferable. The functional group is at least one selected from an epoxy group, an amino group, and an isocyanate group, for example. Examples of the alkyl group that is substituted by such a functional group can be those described earlier. Moreover, in the chemical formula (I), m is equal to the valence of a metallic element M$^1$, while n denotes an integer of 0 to (m−1). Furthermore, in the chemical formula (I), k indicates an integer of 0 to (m−1), and $1 \leq n+k \leq (m-1)$.

Specific examples of the compound (A) include gamma-glycidoxypropyltrimethoxysilane, gamma-glycidoxypropyltriethoxysilane, gamma-glycidoxypropyltrichlorosilane, gamma-aminopropyltrimethoxysilane, gamma-aminopropyltriethoxysilane, gamma-aminopropyltrichlorosilane, gamma-chloropropyltrimethoxysilane, gamma-chloropropyltriethoxysilane, gamma-chloropropyltrichlorosilane, gamma-bromopropyltrimethoxysilane, gamma-bromopropyltriethoxysilane, gamma-bromopropyltrichlorosilane, gamma-mercaptopropyltrimethoxysilane, gamma-mercaptopropyltriethoxysilane, gamma-mercaptopropyltrichlorosilane, gamma-isocyanatopropyltrimethoxysilane, gamma-isocyanatopropyltriethoxysilane, gamma-isocyanatopropyltrichlorosilane, gamma-ureidopropyltrimethoxysilane, gamma-ureidopropyltriethoxysilane, gamma-ureidopropyltrichlorosilane, etc. Preferable examples of the compound (A) include gamma-glycidoxypropyltrimethoxysilane, gamma-glycidoxypropyltriethoxysilane, gamma-chloropropyltrimethoxysilane, gamma-chloropropyltriethoxysilane, gamma-aminopropyltrimethoxysilane, and gamma-aminopropyltriethoxysilane.

The compound (B) is at least one compound that is expressed by the following chemical formula (II):

$$M^2(OR^2)_q R^3_{p-q-r} X^2_r \qquad (II).$$

In the chemical formula (II), M$^2$ denotes an atom selected from Si, Al, Ti, Zr, Cu, Ca, Sr, Ba, Zn, B, Ga, Y, Ge, Pb, P, Sb, V, Ta, W, La, and Nd. M$^2$ is preferably Si, Al, Ti, or Zr, particularly preferably Si, Al, or Ti. In the chemical formula (II), R$^2$ indicates an alkyl group such as a methyl group, an ethyl group, an n-propyl group, an iso-propyl group, an n-butyl group, a t-butyl group, etc. and is preferably a methyl group or an ethyl group. Furthermore, in the chemical formula (II), X$^2$ denotes a halogen atom. Examples of the halogen atom that is indicated by X$^2$ include a chlorine atom, a bromine atom, an iodine atom, etc. but a chlorine atom is preferable. In the chemical formula (II), R$^3$ indicates an alkyl group, an aralkyl group, an aryl group, or an alkenyl group. Examples of the alkyl group that is indicated by R$^3$ include a methyl group, an ethyl group, an n-propyl group, an iso-propyl group, an n-butyl group, a t-butyl group, an n-octyl group, etc. Examples of the aralkyl group that is indicated by R$^3$ include a benzyl group, a phenethyl group, a trityl group, etc. Examples of the aryl group that is indicated by $R^3$ include a phenyl group, a naphthyl group, a tolyl group, a xylyl group, a mesityl group, etc. Furthermore, examples of the alkenyl group that is indicated by $R^3$ include a vinyl group, an allyl group, etc. In the chemical formula (II), p is equal to the valence of a metallic element $M^2$, while q denotes an integer of 0 to p. Moreover, in the chemical formula (II), r indicates an integer of 0 to p, and $1 \leq q+r \leq p$.

In the chemical formulae (I) and (II), $M^1$ and $M^2$ may be identical to each other or may be different from each other. In addition, $R^1$ and $R^2$ also may be identical to each other or may be different from each other.

Specific examples of the compound (B) include: silicon alkoxides such as tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, trichloroethoxysilane, etc.; halogenated silane such as vinyltrichlorosilane, tetrachlorosilane, tetrabromosilane, etc.; alkoxy titanium compounds such as tetramethoxytitanium, tetraethoxytitanium, tetraisopropoxytitanium, methyltriisopropoxytitanium, etc.; halogenated titanium such as tetrachlorotitanium, etc.; alkoxyaluminum compounds such as trimethoxyaluminum, triethoxyaluminum, triisopropoxyaluminum, methyldiisopropoxyaluminum, tributoxyaluminum, diethoxyaluminum chloride, etc.; and alkoxyzirconium compounds such as tetraethoxyzirconium, tetraisopropoxyzirconium, methyltriisopropoxyzirconium, etc.

The composition that forms the gas barrier layer of the gas barrier layered product according to the present invention includes a hydrolyzed and condensed product of the compound (L). At least a part of the halogen and alkoxy group of the compound (L) is substituted by a hydroxyl group through hydrolysis of the compound (L). Further, a compound to which a metallic element has been bonded via oxygen is formed through condensation of the hydrolysis product. When this condensation is repeated, a compound that can be considered substantially as a metal oxide is obtained. In this case, in order to cause the hydrolysis and condensation, it is important that a halogen atom or an alkoxy group has been bonded to metal. When neither a halogen atom nor an alkoxy group has been bonded thereto, hydrolysis and condensation do not occur or occur very slowly. Accordingly, in such a case, it is difficult to obtain the effect of the present invention.

The hydrolyzed and condensed product of the compound (L) contained in the gas barrier layer has preferably a condensation degree P, which is defined below, of 65 to 99%, more preferably 70 to 99%, and further preferably 75 to 99%. The condensation degree P(%) of the hydrolyzed and condensed product of the compound (L) is calculated as follows.

Suppose the total number of the alkoxy groups and the halogen atoms contained in one molecule of the compound (L) is indicated by a. When the proportion of the compound (L) in which the total number of the condensed alkoxy groups and halogen atoms in the hydrolyzed and condensed product of the compound (L) is i is yi(%) of the whole compound (L), a value of $\{(i/a) \times yi\}$ is calculated with respect to each proportion yi obtained when i is an integer of 1 to a (including 1 and a). Then the values thus obtained are added. That is, the condensation degree P(%) is defined by the following mathematical expression:

$$P = \sum_{i=1}^{a} \{(i/a) \times yi\}. \qquad \text{[Mathematical Expression 1]}$$

With respect to the hydrolyzed and condensed product of the compound (L) contained in the gas barrier layer, the above-mentioned value yi can be determined by solid-state NMR (the DD/MAS method), for example.

The hydrolyzed and condensed product can be produced using a raw material by, for example, a technique that is used in a well-known sol-gel method. Examples of the raw material include the compound (L), a partial hydrolysate of the compound (L), a total hydrolysate of the compound (L), a partial hydrolyzed and condensed product of the compound (L), a product obtained through condensation of a part of a total hydrolysate of the compound (L), and a combination thereof These raw materials may be produced by a well-known method, or commercially available raw materials may be used. The raw material is not particularly limited. For example, a condensate that is obtained through hydrolysis and condensation of approximately 2 to 10 molecules can be used as the raw material. Specifically, the raw material to be used herein can be a linear condensate of dimer to decamer obtained through hydrolysis and condensation of tetramethoxysilane, for example.

The number of molecules to be condensed in the hydrolyzed and condensed product of the compound (L) contained in the composition that forms the gas barrier layer, can be controlled through adjustments in the quantity of water, the type and concentration of a catalyst, the temperature at which the hydrolysis and condensation are carried out, etc. that are employed for the hydrolysis and condensation.

The method for producing the hydrolyzed and condensed product of the compound (L) is not particularly limited. In a typical example of the sol-gel method, hydrolysis and condensation are carried out by adding water, acid, and alcohol to the above-mentioned raw materials.

In the below, the compound (L) may by described as metal alkoxide (a compound containing metal to which an alkoxy group has been bonded) in some cases. However, a compound containing metal to which halogen has been bonded may be used instead of the metal alkoxide.

As described above, the compound (L) can be at least one of the compound (A) and/or the compound (B). It is preferable that the compound (L) include the compound (A) alone or both the compound (A) and the compound (B), because in this case, the gas barrier layered product has an excellent gas barrier property. It is further preferable that the compound (L) be composed substantially of both the compound (A) and the compound (B) and the mole ratio of the compound (A)/the compound (B) be in the range of 0.5/99.5 to 40/60. When the compound (A) and the compound (B) are used together in such a ratio, the gas barrier layered product has excellent performance in areas such as a gas barrier property, dynamic properties such as a tensile strength and elongation, appearance, and a handling property, for example. The mole ratio of the compound (A)/the compound (B) is more preferably in the range of 3/97 to 40/60, further preferably in the range of 4/96 to 30/70.

In another example of the present invention, an organic group further may be bonded to the metal atom of the compound (L). In this case, the organic group has at least one characteristic group selected from a halogen atom, a mercapto group, and a hydroxyl group. Hereinafter, the compound (L) in which such an organic group has been bonded may be referred to as a "compound (L')" in some cases. According to this structure, a layered product having a particularly good surface appearance can be obtained.

The metal atom of the compound (L') to be used herein can be silicon, tin, and titanium. A silicon atom may be classified into a nonmetallic element in some cases but is considered as a metal element in this specification. Particularly, a silicon atom is preferable since the reaction thereof is easy to control, it allows stable products to be obtained, and it is readily available. An organic group and at least one characteristic group selected from a halogen atom and an alkoxy group have been bonded to the silicon atom. The organic group has at least one characteristic group selected from a halogen atom, a mercapto group, and a hydroxyl group. In addition, another substituent may be bonded to the silicon atom, as long as the effects of the present invention are obtained. Examples of such a substituent include a hydrogen atom, an alkyl group, an alkenyl group, an aryl group, an aralkyl group, and an amino group. Examples of the compound (L') containing a silicon atom include compounds that are expressed by the following formula (I'), allyl(chloropropyl)dichlorosilane, bis(chloromethyldimethylsiloxy)benzene, N-(3-triethoxysilylpropyl)gluconamide, and N-(3-triethoxysilylpropyl)-4-hydroxybutyramide.

The compound (L') may contain at least one compound (A') that is expressed by the following chemical formula (I'):

$$Si(OR^1)_s R^4_t X^1_u Z^2_{4-s-t-u} \qquad (I').$$

In the chemical formula (I'), $R^1$ and $R^4$ each denote an alkyl group independently; $X^1$ indicates a halogen atom; $Z^2$ denotes an organic group having at least one characteristic group selected from a halogen atom, a mercapto group, and a hydroxyl group; s indicates an integer of 0 to 3; t denotes an integer of 0 to 2; u indicates an integer of 0 to 3; $1 \leq s+u \leq 3$; and $1 \leq s+t+u \leq 3$.

$R^1$ and $R^4$ each are independently an alkyl group such as a methyl group, an ethyl group, an n-propyl group, an iso-propyl group, an n-butyl group, a t-butyl group, etc. Preferably, $R^1$ and $R^4$ each are a methyl group or an ethyl group. Examples of the halogen that is indicated by $X^1$ include chlorine, bromine, iodine, etc. The halogen is preferably chlorine.

The organic group $Z^2$ may be a hydrocarbon group (with a carbon number of approximately one to five) that has been substituted by at least one characteristic group selected from a halogen atom, a mercapto group, an isocyanate group, a ureide group, and a hydroxyl group. Examples of such an organic group include a chloromethyl group, a chloroethyl group, a chloropropyl group, a chloroethylmethyl group, or organic groups obtained by replacing the chloro group thereof by a bromo group, an iodine group, a fluorine group, a mercapto group, or a hydroxyl group. In addition, the organic group $Z^2$ may be one having an amide structure and at least one characteristic group selected from a halogen atom, a mercapto group, and a hydroxyl group.

Specific examples of the compound (A') that is expressed by the formula (I') in which t is 1 or 2 include chloromethyl methyldimethoxysilane, chloromethyl dimethylmethoxysilane, 2-chloroethylmethyl dimethoxysilane, 2-chloroethyl dimethylmethoxysilane, 3-chloropropylmethyl dimethoxysilane, 3-chloropropyl dimethylmethoxysilane, mercaptomethyl methyldimethoxysilane, mercaptomethyl dimethylmethoxysilane, 2-mercaptoethylmethyl dimethoxysilane, 2-mercaptoethyl dimethylmethoxysilane, 3-mercaptopropylmethyl dimethoxysilane, 3-mercaptopropyl dimethylmethoxysilane, and bis(chloromethyl)methylchlorosilane. Furthermore, other compounds may be used that are obtained by replacing the methoxy group of the above-mentioned compounds by a chlorine group or an alkoxy group, such as an ethoxy group, an n-propoxy group, an iso-propoxy group, an n-butoxy group, t-butoxy group, etc.

Specific examples of the compound (A') that is expressed by the formula (I') in which t is 0 include chloromethyltrimethoxysilane, 2-chloroethyltrimethoxysilane, 3-chloropropyltrimethoxysilane, 2-chloropropyltrimethoxysilane, 4-chlorobutyltrimethoxysilane, 5-chloropentyltrimethoxysilane, 6-chlorohexyltrimethoxysilane, (dichloromethyl)dimethoxysilane, (dichloroethyl)dimethoxysilane, (dichloropropyl)dimethoxysilane, (trichloromethyl)methoxysilane, (trichloroethyl)methoxysilane, (trichloropropyl)methoxysilane, mercaptomethyltrimethoxysilane, 2-mercaptoethyltrimethoxysilane, 3-mercaptopropyltrimethoxysilane, 2-mercaptopropyltrimethoxysilane, 4-mercaptobutyltrimethoxysilane, 5-mercaptopentyltrimethoxysilane, 6-mercaptohexyltrimethoxysilane, (dimercaptomethyl)dimethoxysilane, (dimercaptoethyl)dimethoxysilane, (dimercaptopropyl)dimethoxysilane, (trimercaptomethyl)methoxysilane, (trimercaptoethyl)methoxysilane, (trimercaptopropyl)methoxysilane, fluoromethyltrimethoxysilane, 2-fluoroethyltrimethoxysilane, 3-fluoropropyltrimethoxysilane, bromomethyltrimethoxysilane, 2-bromoethyltrimethoxysilane, 3-bromopropyltrimethoxysilane, iodomethyltrimethoxysilane, 2-iodoethyltrimethoxysilane, 3-iodopropyltrimethoxysilane, (chloromethyl)phenyltrimethoxysilane, (chloromethyl) phenylethyltrimethoxysilane, 1-chloroethyltrimethoxysilane, 2-(chloromethyl)allyltrimethoxysilane, (3-chlorocyclohexyl)trimethoxysilane, (4-chlorocyclohexyl)trimethoxysilane, (mercaptomethyl)phenyltrimethoxysilane, (mercaptomethyl)phenylethyltrimethoxysilane, 1-mercaptoethyltrimethoxysilane, 2-(mercaptomethyl)allyltrimethoxysilane, (3-mercaptocyclohexyl)trimethoxysilane, (4-mercaptocyclohexyl)trimethoxysilane, N-(3-triethoxysilylpropyl)gluconamide, and N-(3-triethoxysilylpropyl)-4-hydroxybutylamide. In addition, other compounds may be used that are obtained by replacing the methoxy group of the above-mentioned compounds by a chlorine group or an alkoxy group, such as an ethoxy group, an n-propoxy group, an iso-propoxy group, an n-butoxy group, t-butoxy group, etc.

Preferably, the compound (L') contains at least one compound selected from chloromethyltrimethoxysilane, chloromethyltriethoxysilane, chloromethyltrichlorosilane, 2-chloroethyltrimethoxysilane, 2-chloroethyltriethoxysilane, 2-chloroethyltrichlorosilane, 3-chloropropyltrimethoxysilane, 3-chloropropyltriethoxysilane, 3-chloropropyltrichlorosilane, mercaptomethyltrimethoxysilane, mercaptomethyltriethoxysilane, mercaptomethyltrichlorosilane, 2-mercaptoethyltrimethoxysilane, 2-mercaptoethyltriethoxysilane, 2-mercaptoethyltrichlorosilane, 3-mercaptopropyltrimethoxysilane, 3-mercaptopropyltriethoxysilane, 3-mercaptopropyltrichlorosilane, (chloromethyl)phenyltrimethoxysilane, (chloromethyl)phenyltriethoxysilane, (chloromethyl)phenyltrichlorosilane, (chloromethyl)phenylethyltrimethoxysilane, (chloromethyl)phenylethyltriethoxysilane, (chloromethyl)phenylethyltrichlorosilane, (mercaptomethyl)phenyltrimethoxysilane, (mercaptomethyl)phenyltriethoxysilane, (mercaptomethyl)phenyltrichlorosilane, (mercaptomethyl)phenylethyltrimethoxysilane, (mercaptomethyl)phenylethyltriethoxysilane, (mercaptomethyl)phenylethyltrichlorosilane, hydroxymethyltrimethoxysilane, hydroxyethyltrimethoxysilane, hydroxypropyltrimethoxysilane, N-(hydroxyethyl)-N-methylaminopropyltrimethoxysilane, N-(3-triethoxysilylpropyl)gluconamide, and N-(3-triethoxysilylpropyl)-4-hydroxybutylamide.

Among others, it is preferable that the compound (L') contain at least one compound selected from chloromethyltrialkoxysilane, chloromethyltrichlorosilane, 2-chloroethyltrialkoxysilane, 2-chloroethyltrichlorosilane, 3-chloropropyltrialkoxysilane, 3-chloropropyltrichlorosilane, mercaptomethyltrialkoxysilane, mercaptomethyltrichlorosilane, 2-mercaptoethyltrialkoxysilane, 2-mercaptoethyltrichlorosilane, 3-mercaptopropyltrialkoxysilane, 3-mercaptopropyltrichlorosilane, N-(3-trialkoxysilylpropyl) gluconamide, and N-(3-trialkoxysilylpropyl)-4-hydroxybutylamide. The use of these compounds allows a gas barrier layered product with excellent transparency to be obtained. Particularly preferable compounds (L') include chloromethyltrimethoxysilane, chloromethyltriethoxysilane, 3-chloropropyltrimethoxysilane, 3-chloropropyltriethoxysilane, mercaptomethyltrimethoxysilane, mercaptomethyltriethoxysilane, 3-mercaptopropyltrimethoxysilane, and 3-mercaptopropyltriethoxysilane. When these compounds are used as the compound (L'), a gas barrier layered product that is excellent in both gas barrier property and transparency can be obtained. The present invention makes it possible to obtain a gas barrier layered product that has a haze value of 3% or lower and therefore has an excellent transparency.

These compounds (L') may be commercially available compounds or may be synthesized by a well-known method.

The gas barrier layered product produced using the compound (L') can have an oxygen transmission rate of 1.0 $cm^3$/$m^2$·day·atm or lower in an atmosphere of 20° C. and 85% RH. In addition, the gas barrier layered product of the example that is described as another example above, can have a haze value of 3% or lower.

In the example that is described as another example above, the compound (L) further may contain at least one compound (B) that is expressed by the above-mentioned chemical formula (II) in addition to the compound (A'). In the chemical formulae (I') and (II), $R^1$ and $R^2$ may be identical to each other or may be different from each other.

When the compound (L) includes the compound (A') and the compound (B), the mole ratio of the compound (A')/the compound (B) is preferably in the range of 0.1/99.9 to 40/60, more preferably in the range of 0.5/99.5 to 30/70, and most preferably in the range of 1/99 to 20/80 (for instance, 5/95 to 20/80). When the compound (A') and the compound (B) are used together in such a ratio, a gas barrier layered product is obtained that has excellent performance in areas such as a gas barrier property, dynamic properties such as a tensile strength and elongation, appearance, and a handling property, for example.

Carboxylic Acid-Containing Polymer

The composition that forms the gas barrier layer contains a neutralized product of a polymer containing at least one functional group selected from a carboxyl group and a carboxylic anhydride group. In the composition, the content of the neutralized product of the polymer is not particularly limited but can be in the range of 25 wt % to 95 wt %, for example. The neutralized product of the polymer is obtained as follows: with respect to the polymer (hereinafter also referred to as a "carboxylic acid-containing polymer" in some cases) containing at least one functional group selected from a carboxyl group and a carboxylic anhydride group, at least a part of the at least one functional group described above is neutralized with a metal ion having a valence of two or more. The carboxylic acid-containing polymer has at least two carboxyl groups or at least one carboxylic anhydride group in one molecule of the polymer. Specifically, a polymer can be used that contains, in one molecule thereof, at least two structure units, each of which has at least one carboxyl group, such as acrylic acid units, methacrylic acid units, maleic acid units, and itaconic acid units. A polymer also can be used that contains a structure unit having a structure of carboxylic anhydride, such as a maleic anhydride unit and a phthalic anhydride unit. The structure units that have at least one carboxyl group and/or the structure units that have the structure of a carboxylic anhydride (hereinafter together they may both be described briefly as a "carboxylic acid-containing unit (C)" in some cases), which are contained in the polymer, may be of one type or may be of two types or more.

When the content of the carboxylic acid-containing unit (C) in all the structure units of the carboxylic acid-containing polymer is at least 10 mol %, a gas barrier layered product can be obtained that has an excellent gas barrier property under a high humidity condition. This content is more preferably at least 20 mol %, further preferably at least 40 mol %, and particularly preferably at least 70 mol %. When the carboxylic acid-containing polymer includes both the structure unit containing at least one carboxyl group and the structure unit having the structure of carboxylic anhydride, the total of the contents thereof should be in the above-mentioned range.

Besides the carboxylic acid-containing unit (C), other structure units that can be contained in the carboxylic acid-containing polymer are not particularly limited. Examples thereof include at least one structure unit selected from: structure units derived from (meth)acrylate esters, such as a methyl acrylate unit, a methyl methacrylate unit, an ethyl acrylate unit, an ethyl methacrylate unit, a butyl acrylate unit, a butyl methacrylate unit, etc.; structure units derived from vinyl esters, such as a vinyl formate unit, a vinyl acetate unit, etc.; a styrene unit, a p-styrenesulfonic acid unit; and structure units derived from olefins, such as an ethylene unit, a propylene unit, and an isobutylene unit. When the carboxylic acid-containing polymer includes at least two structure units, the carboxylic acid-containing polymer can take any one of the following forms: the form of an alternating copolymer, the form of a random copolymer, the form of a block copolymer, and in addition, the form of a tapered copolymer.

Preferable examples of the carboxylic acid-containing polymer include polyacrylic acid, polymethacrylic acid, and poly(acrylic acid/methacrylic acid). The carboxylic acid-containing polymer may be of one type or may be a mixture of at least two types of polymers. For instance, at least one polymer selected from polyacrylic acid and polymethacrylic acid may be used. Furthermore, specific examples of the carboxylic acid-containing polymer that includes the structure units described as other structure units above include an ethylene-maleic anhydride copolymer, a styrene-maleic anhydride copolymer, an isobutylene-maleic anhydride alternating copolymer, an ethylene-acrylic acid copolymer, and a saponified product of an ethylene-ethyl acrylate copolymer.

The molecular weight of the carboxylic acid-containing polymer is not particularly limited. However, since the gas barrier layered product is to be obtained that has an excellent gas barrier property and excellent dynamic properties such as, for example, drop impact strength, the number average molecular weight thereof is preferably at least 5,000, more preferably at least 10,000, and further preferably at least 20,000. There is no particular upper limit on the molecular weight of the carboxylic acid-containing polymer. Generally, however, it is 1,500,000 or less.

Similarly, the molecular weight distribution of the carboxylic acid-containing polymer also is not particularly limited. However, in considerations of surface appearance such as haze of the gas barrier layered product and excellent storage stability of the solution (S) to be described later, the molecular weight distribution that is indicated by a ratio of weight average molecular weight/number average molecular weight of the carboxylic acid-containing polymer is preferably in the range of 1 to 6, more preferably in the range of 1 to 5, and further preferably in the range of 1 to 4.

The polymer that forms the gas barrier layer of the gas barrier layered product according to the present invention is obtained by neutralizing at least a part of at least one functional group (hereinafter also referred to as a "functional group (F)" in some cases) selected from a carboxyl group and a carboxylic anhydride group of the carboxylic acid-containing polymer, with a metal ion having a valence of two or more. In other words, this polymer contains a carboxyl group that has been neutralized with a metal ion having a valence of two or more.

In the polymer that forms the gas barrier layer, for example, at least 10 mol % (for instance, at least 15 mol %) of the —COO— groups contained in the functional group (F) have been neutralized with metal ions having a valence of two or more. The carboxylic anhydride group is considered to include two —COO— groups. That is, when a mol of carboxyl group and b mol of carboxylic anhydride group exist, the amount of the —COO— groups contained therein is (a+2b) mol in total. The ratio of the —COO— groups that have been neutralized with metal ions having a valence of two or more to the —COO— groups contained in the functional group (F) is preferably at least 20 mol %, more preferably at least 30 mol %, further preferably at least 40 mol %, and particularly preferably at least 50 mol % (for instance, at least 60 mol %). There is no particular upper limit on the ratio of the —COO— groups that have been neutralized with metal ions having a valence of two or more to the —COO— groups contained in the functional group (F). However, the upper limit can be 95 mol % or lower, for example. With the carboxyl group and/or the carboxylic anhydride group of the carboxylic acid-containing polymer being neutralized with metal ions having a valence of two or more, the gas barrier layered product of the present invention exhibits an excellent gas barrier property under both a dry condition and a high humidity condition.

The neutralization degree (the ionization degree) of the functional group (F) can be determined by measuring the infrared absorption spectrum of the gas barrier layered product by the ATR (attenuated total reflection) method, or by removing the gas barrier layer from the gas barrier layered product and then measuring the infrared absorption spectrum thereof by the KBr method. The peak attributed to C=O stretching vibration of the carboxyl group or carboxylic anhydride group obtained before neutralization (before ionization) is observed in the range of 1600 cm$^{-1}$ to 1850 cm$^{-1}$. On the other hand, the C=O stretching vibration of the carboxyl group obtained after the neutralization (the ionization) is observed in the range of 1500 cm$^{-1}$ to 1600 cm$^{-1}$. Accordingly, they can be evaluated individually with the infrared absorption spectra thereof. Specifically, the ratio between them is determined from the maximum absorbances in the respective ranges, and then the ionization degree of the polymer that forms the gas barrier layer of the gas barrier layered product is calculated using an analytical curve prepared beforehand. The analytical curve can be prepared through the measurements of infrared absorption spectra of a plurality of standard samples that are different in neutralization degree from each other.

It is important that the metal ions that neutralize the functional group (F) have a valence of two or more. When the functional group (F) has not been neutralized or has been neutralized by only the univalent ions to be described later, the layered product obtained thereby does not have an excellent gas barrier property. However, when the functional group (F) has been neutralized with a small amount of univalent ions (positive ions) in addition to metal ions with a valence of two or more, the haze of the gas barrier layered product is reduced and thereby a good surface appearance is obtained. Thus, the case where the functional group (F) of the carboxylic acid-containing polymer is neutralized with both the metal ions having a valence of two or more and the univalent ions also is included in the range of the present invention. Examples of the metal ions having a valence of two or more include a calcium ion, a magnesium ion, a divalent iron ion, a trivalent iron ion, a zinc ion, a divalent copper ion, a lead ion, a divalent mercury ion, a barium ion, a nickel ion, a zirconium ion, an aluminum ion, a titanium ion, etc. For example, at least one ion selected from a calcium ion, a magnesium ion, a barium ion, and a zinc ion may be used as the metal ion having a valence of two or more.

In the present invention, it is preferable that 0.1 to 10 mol % of the —COO— groups contained in the functional group (F) (the carboxyl group and/or the carboxylic anhydride) of the carboxylic acid-containing polymer have been neutralized with univalent ions. However, when the degree of the neutralization achieved with the univalent ions is high, the gas barrier property of the gas barrier layered product deteriorates. The degree of the neutralization of the functional group (F) achieved with the univalent ions is more preferably in the range of 0.5 to 5 mol %, further preferably in the range of 0.7 to 3 mol %. Examples of the univalent ions include an ammonium ion, a pyridinium ion, a sodium ion, a potassium ion, a lithium ion, etc. Among them, an ammonium ion is preferable.

Inorganic Components and Others

Preferably, the content of inorganic components in the composition that forms the gas barrier layer is in the range of 5 to 50 wt %, since the range allows the gas barrier layered product to have an excellent gas barrier property. This content is more preferably in the range of 10 to 45 wt %, further preferably in the range of 15 to 40 wt %, and still further preferably in the range of 25 to 40 wt %. The content of the inorganic components in the composition can be calculated from the weight of the raw materials that are used for preparing the composition. That is, suppose the compound (L), a partial hydrolysate of the compound (L), a total hydrolysate of the compound (L), a partial hydrolyzed and condensed product of the compound (L), a product obtained through condensation of a part of a total hydrolysate of the compound (L), or a combination thereof has been totally hydrolyzed and condensed to become a metal oxide, and then the weight of the metal oxide is calculated. The weight of the metal oxide thus calculated is considered as the weight of the inorganic components contained in the component, and thereby the content of the inorganic components is calculated. When an inorganic additive such as metal salt, a metal complex, a metal oxide, etc. that are described later is added, the weight of the inorganic additive that has been added to the composition is added simply to the weight of the inorganic components. The calculation of the weight of the metal oxide is described below further in detail. When the compound (A) that is expressed by the chemical formula (I) is hydrolyzed and condensed totally, a compound whose composition is expressed by a formula of $M^1O_{(n+k)/2}Z^1_{m-n-k}$ is obtained. In this compound, $M^1O_{(n+k)/2}$ is a metal oxide. $Z^1$ is considered not to be included in inorganic components but to be an organic component. On the other hand, when the compound (B) that is expressed by the chemical formula (II) is hydrolyzed and condensed totally, a compound whose composition is expressed by a formula of $M^2O_{(q+r)/2}R^3_{p-q-r}$ is obtained. In this compound, $M^2O_{(q+r)/2}$ is a metal oxide. In this case, the content (%) of the inorganic components is a value obtained by: dividing the weight of the metal oxide by the weight of the components including all the components added by the end of the first process except for volatilization components, such as solvents and compounds that are produced in the process in which the above-mentioned compound (L) is changed into a metal oxide; and then multiplying it by 100.

In the range that does not impair the effects of the present invention, the composition that forms the gas barrier layer may include, if desired: inorganic acid metal salt such as carbonate, hydrochloride, nitrate, hydrogen carbonate, sulfate, hydrogen sulfate, phosphate, borate, aluminate, etc.; organic acid-metal salt such as oxalate, acetate, tartrate, stearate, etc.; a metal complex such as an acetylacetonato metal complex like aluminum acetylacetonato, a cyclopentadienyl metal complex like titanocene, a cyano metal complex, etc.; a layered clay compound, a crosslinker, polyalcohols, high molecular compounds other than those, a plasticizer, an antioxidant, an ultraviolet absorber, flame retardant, etc. The composition that forms the gas barrier layer also may include: fine powder of the metal oxide produced by hydrolyzing and condensing the metal alkoxide by a wet process; fine powder of the metal oxide prepared by hydrolyzing, condensing, or burning metal alkoxide by a dry process; or fine silica powder prepared from water glass, for example.

When polyalcohols are contained in the composition that forms the gas barrier layer of the gas barrier layered product according to the present invention, the gas barrier layered product has a good surface appearance. More specifically, when polyalcohols are contained, the gas barrier layer tends not to be cracked during the production of the gas barrier layered product and thereby a gas barrier layered product with a good surface appearance is obtained.

Such polyalcohols to be used in the present invention are compounds that have at least two hydroxyl groups in a molecule, and they include compounds whose molecular weights range from low to high. Preferably, such polyalcohols are macromolecular compounds such as polyvinyl alcohol, partially saponified polyvinyl acetate, an ethylene-vinyl alcohol copolymer, polyethylene glycol, polyhydroxyethyl(meth) acrylate, polysaccharide such as starch, and a polysaccharide derivative derived from polysaccharide such as starch, etc.

With respect to the amount of the above-mentioned polyalcohols to be used, the weight ratio of the carboxylic acid-containing polymer/the polyalcohols is preferably in the range of 10/90 to 99.5/0.5. The weight ratio is more preferably in the range of 30/70 to 99/1, further preferably 50/50 to 99/1, and most preferably 70/30 to 98/2.

In the gas barrier layered product of the present invention, a gas barrier layer that is made of a composition is formed on at least one surface of the base material. The composition includes a hydrolyzed and condensed product of the above-mentioned compound (L) and a neutralized product of a carboxyl group-containing polymer. This gas barrier layer may be formed on only one surface of the base material or may be formed on both the surfaces thereof. The layered product in which a gas barrier layer is formed on both the surfaces of the base material has an advantage of facilitating a post-processing of attaching another film thereto, for example.

The thickness of the gas barrier layer is not particularly limited but is preferably in the range of 0.1 µm to 100 µm. When it is thinner than 0.1 µm, the gas barrier layered product may have an unsatisfactory gas barrier property in some cases. On the other hand, when it is thicker than 100 µm, the gas barrier layer may tend to be cracked while the gas barrier layered product is processed, transported, and used. The thickness of the gas barrier layer is more preferably in the range of 0.1 µm to 50 µm, further preferably in the range of 0.1 µm to 20 µm.

Base materials formed of various materials can be used as the base material of the gas barrier layered product according to the present invention. Examples of the base material to be used herein include: films such as a thermoplastic resin film and a thermosetting resin film; fiber aggregates such as fabrics, papers, etc.; wood; and films of specified shapes that are formed of a metal oxide, metal, etc. Among them, the thermoplastic resin film is particularly useful as a base material of the gas barrier layered product that is used for a food packaging material. Furthermore, the base material may include a paper layer. With the use of a base material including a paper layer, a layered product for a paper container is obtained. In addition, the base material may have a multilayered structure that is formed of a plurality of materials.

Examples of the thermoplastic resin film include films obtained through formation and processing of: polyolefin-based resin such as polyethylene, polypropylene, etc.; polyester-based resin such as polyethylene terephthalate, polyethylene-2,6-naphthalate, polybutylene terephthalate, copolymers thereof, etc.; polyamide-based resin such as nylon 6, nylon 66, nylon 12, etc.; polystyrene, poly(meth) acrylic ester, polyacrylonitrile, polyvinyl acetate, polycarbonate, polyarylate, regenerated cellulose, polyimide, polyetherimide, polysulfone, polyethersulfone, polyetherether ketone, ionomer resins, etc. Preferable base materials of layered products that are used for food packaging materials are films formed of polyethylene, polypropylene, polyethylene terephthalate, nylon 6, or nylon 66.

The layered product of the present invention further may include an adhesive layer (T) disposed between the base material and the gas barrier layer. According to this structure, the adhesiveness between the base material and the gas barrier layer can be improved. The adhesive layer (T) that is formed of an adhesive resin can be formed by treating the surface of the base material with a well-known anchor coating agent, or applying a well-known adhesives onto the surface of the base material. As a result of the studies made about various adhesive resins, it was found out that an adhesive resin was preferable that had a urethane bond and contained nitrogen atoms (nitrogen atoms of the urethane bond) whose ratio to the whole resin was in the range of 0.5 to 12 wt %. With the use of such an adhesive resin, the adhesiveness between the base material and the gas barrier layer particularly can be improved. When the base material and the gas barrier layer are bonded firmly to each other with the adhesive layer (T) interposed therebetween, the gas barrier property and appearance can be prevented from deteriorating when the gas barrier layered product of the present invention is subjected to processes such as printing, lamination, etc. The content of the nitrogen atoms (nitrogen atoms of the urethane bond) that are contained in the adhesive resin is more preferably in the range of 2 to 11 wt %, further preferably in the range of 3 to 8 wt %.

A preferable adhesive resin having a urethane bond is a two-component reaction type polyurethane-based adhesive in which a polyisocyanate component and a polyol component are mixed together to react with each other.

The polyisocyanate component to be used herein is one that commonly is used for producing polyurethane, for example, a polyisocyanate monomer, a derivative thereof, etc.

The polyisocyanate monomer to be used herein can be aliphatic diisocyanate such as hexamethylene diisocyanate, for example. In addition, alicyclic diisocyanate such as 3-isocyanatomethyl-3,5,5-trimethylcyclohexylisocyanate, dicyclohexylmethane-4,4'-diisocyanate, 1,3- or 1,4-bis(isocyanatomethyl)cyclohexane, or a mixture thereof also can be used. Furthermore, aromatic-aliphatic diisocyanate such as 1,3- or 1,4-xylylene diisocyanate or a mixture thereof, 1,3- or 1,4-bis(1-isocyanato-1-methylethyl)benzene or a mixture thereof, etc. also can be used. Moreover, aromatic diisocyanate such as 2,4- or 2,6-tolylenediisocyanate or a mixture thereof, 4,4'-diphenylmethane diisocyanate, p-phenylenediisocyanate, 1,5-naphtylene diisocyanate, etc. also can be used.

For the derivative of the polyisocyanate monomer, polymers of polyisocyanate, such as dimers or trimers of the above-mentioned polyisocyanate monomers can be used. The modified polyisocyanate also can be used. Examples thereof include a modified biuret, a modified allophanate, or a modified oxadiazinetrion that are obtained through the reactions between the above-mentioned polyisocyanate monomers and water, polyol, or carbon dioxide, respectively. In addition, for instance, a polyol adduct and/or a polyamine adduct are/is used that can be obtained through the reactions between the above-mentioned polyisocyanate monomers and polyol and/or polyamine, respectively.

These polyisocyanate components may be used individually or two or more of them may be used together. Preferably, the derivative of a polyisocyanate monomer is used.

Preferably, polyester polyol is used as the above-mentioned polyol component. Polyester polyol contains an ester unit. The ester unit is a unit including an ester bond. It is formed through the reaction between polyol and polybasic acid and/or alkyl ester thereof.

The polybasic acid is not particularly limited. However, preferable examples of the polybasic acid to be used herein include: aromatic dicarboxylic acid, such as orthophthalic acid, isophthalic acid, terephthalic acid, 2,6-naphthalenedicarboxylic acid, etc., and/or alkyl ester thereof and dimer acid and aliphatic dicarboxylic acid, such as glutaric acid, succinic acid, adipic acid, pimelic acid, suberic acid, azelaic acid, sebacic acid, dodecanoic diacid, 2-methylsuccinic acid, 2-methyladipic acid, 3-methyladipic acid, 3-methylpentanedioic acid, 2-methyloctanedioic acid, 3,8-dimethyl decanedioic acid, 3,7-dimethyl decanedioic acid, etc. Furthermore, alkyl ester of the polybasic acid is not particularly limited. Preferably, however, alkyl esters of the above-mentioned polybasic acids are used.

Preferable examples of polyol to be used herein include glycols such as ethylene glycol, diethylene glycol, propylene glycol, 1,3-butanediol, 1,4-butanediol, 2-methyl-1,3-propanediol, neopentyl glycol, 1,6-hexanediol, 1,7-heptanediol, 1,9-nonanediol, cyclohexanedimethanol, 3-methyl-1,5-pentanediol, 3,3'-dimethylolheptane, 2-methyl-1,8-octanediol, etc. Furthermore, triols such as glycerin, trimethylol propane, etc. also can be used preferably. In addition, dimethylol alkanoic acid, such as dimethylol propionic acid, dimethylol butanoic acid, etc. also can be used preferably.

Polyester polyol is not particularly limited as long as the above-mentioned polyester unit is contained therein. Polyester polyol can be synthesized by a well-known method. That is, polyester polyol is obtained by allowing polybasic acid and/or alkyl ester thereof to react with polyol in an inert gas atmosphere at 160 to 250° C.

Polyester polyol may be used as a polyol component without further processing. Furthermore, polyurethane polyester polyol is produced by subjecting polyester polyol to a chain elongation reaction with polyisocyanate, which then may be used as a polyol component. Moreover, high-molecular-weight polyester polyol is produced through the condensation reaction of polyester polyol, which then may be used as a polyol component. When polyester polyol is subjected to the chain elongation reaction or condensation reaction and thereby its molecular weight increases, adhesives with various physical properties can be obtained. When polyester polyol is used as a polyol component without further processing, the number average molecular weight thereof is preferably at least 500 but less than 3000, for example.

Preferably, a two-component reaction type polyurethane-based adhesive is applied to a base material film after an organic solvent is added to the polyisocyanate component and a polyol component to make an adjustment so that the concentration of the solid content is in the range of 0.5 to 50 wt %. Preferable examples of the organic solvent to be used herein include: esters such as methyl acetate, ethyl acetate, etc.; ketones such as methyl ethyl ketone, methyl isobutyl ketone, cyclohexanone, etc.; and aromatic hydrocarbon such as toluene, xylene, etc. When these organic solvents contain a large amount of moisture, the adhesive strength between the base material and the gas barrier layer that are disposed with the adhesive layer (T) being interposed therebetween decreases. The content (a weight ratio) of moisture that is contained in the organic solvent is preferably 3000 ppm or less, more preferably 2000 ppm or less, and further preferably 1000 ppm or less. In order to reduce the amount of moisture that is contained in the organic solvent, it is preferable that an organic solvent whose initial moisture content is lower be used and in addition, operations be carried out in such a manner that the solvent, solution, and gas barrier layer are prevented from coming into contact with the air as much as possible. For example, it is preferable to employ methods of, for example, using a device that is of a closed type and can be operated from the outside, minimizing the number of times and the period of time of contact with the air, or sealing an opening with nitrogen.

When the moisture contained in the organic solvent exceeds 3000 ppm, the adhesive layer (T) tends to become inhomogeneous. In order for a base material and a gas barrier layer to be bonded firmly to each other with the adhesive layer (T) being interposed therebetween, it is important that the adhesive layer (T) is homogeneous. The inventors found out that the homogeneity of the adhesive layer (T) could be evaluated in terms of variations in haze value of the gas barrier layered product. The haze value is measured by the method described in Examples, and then the standard deviation is determined. When the value that is three times the standard deviation is in the range of 0 to 2.0, the above-mentioned adhesiveness is high. This value is more preferably in the range of 0 to 1.5, further preferably in the range of 0 to 1.0.

The strength of the gas barrier layered product can be improved by increasing the thickness of the adhesive layer (T). However, when the thickness is increased excessively, the appearance is deteriorated. Preferably, the thickness of the adhesive layer (T) is in the range of 0.04 µm to 0.18 µm. This configuration can prevent the gas barrier property and appearance from deteriorating when the gas barrier layered product of the present invention is subjected to processes such as printing, lamination, etc. In addition, the configuration can improve the drop strength of the packaging material produced using the gas barrier layered product of the present invention. The thickness of the adhesive layer (T) is more preferably in the range of 0.06 µm to 0.16 µm, further preferably in the range of 0.07 µm to 0.14 µm.

The layered product of the present invention may include a layer of an inorganic substance (hereinafter also referred to as an "inorganic layer") between the base material and the gas barrier layer. The inorganic layer can be formed with an inorganic substance such as an inorganic oxide. The inorganic layer can be formed by a vapor phase film forming method such as a vapor deposition method.

The inorganic substance that forms the inorganic layer should be one having a gas barrier property with respect to oxygen, water vapor, etc. Preferably, it has transparency. The inorganic layer can be formed using inorganic oxide such as aluminum oxide, silicon oxide, silicon oxynitride, magnesium oxide, tin oxide, or a mixture thereof, for example. Among them, aluminum oxide, silicon oxide, and magnesium oxide can be used preferably since they have an excellent barrier property with respect to gases such as oxygen, water vapor, etc.

Preferable thickness of the inorganic layer varies depending on the type of the inorganic oxide that forms the inorganic layer but generally is in the range of 2 nm to 500 nm. The thickness that allows the gas barrier layered product to have excellent gas barrier property and mechanical property is selected in this range. When the thickness of the inorganic layer is less than 2 nm, the inorganic layer has no reproducibility in exhibiting the barrier property with respect to gases such as oxygen and water vapor, and does not exhibit a satisfactory gas barrier property in some cases. In the case where the thickness of the inorganic layer exceeds 500 nm, the gas barrier property tends to deteriorate when the gas barrier layered product is stretched or bended. Accordingly, the thickness of the inorganic layer is preferably in the range of 5 to 200 nm, more preferably in the range of 10 to 100 nm.

An inorganic layer can be formed by depositing inorganic oxide on a base material. Examples of the formation method include a vacuum vapor deposition method, a sputtering method, an ion plating method, a chemical vapor deposition method (CVD), etc. Among them, the vacuum vapor deposition method can be used preferably in view of productivity. A preferable heating method that is employed for carrying out the vacuum vapor deposition is one of an electron ray heating method, a resistance heating method, and an induction heating method. In order to improve the adhesiveness between the inorganic layer and the base material as well as the denseness of the inorganic layer, the vapor deposition may be carried out using the plasma assist method or the ion beam assist method. In order to improve the transparency of the inorganic layer, the reactive vapor deposition method in which, for example, oxygen gas is blown in to cause a reaction may be employed for depositing the layer.

The fine structure of the gas barrier layer is not particularly limited. It, however, is preferable that the gas barrier layer have the fine structure to be described below because in that case, an excellent gas barrier property can be obtained and the gas barrier property can be prevented from deteriorating when the gas barrier layered product is elongated. A preferable fine structure is a sea-island structure that consists of a sea phase (P) and an island phase (Q). The island phase (Q) is a region where the proportion of the hydrolyzed and condensed product of the compound (L) is higher as compared to the sea phase (P).

Preferably, the sea phase (P) and the island phase (Q) each have further a fine structure. For example, the sea phase (P) further may have a sea-island structure that consists of a sea phase (P1) that is formed mainly of a neutralized product of a carboxylic acid-containing polymer, and an island phase (P2) that is formed mainly of a hydrolyzed and condensed product of the compound (L). Furthermore, the island phase (Q) further may have a sea-island structure that consists of a sea phase (Q1) that is formed mainly of a neutralized product of a carboxylic acid-containing polymer, and an island phase (Q2) that is formed mainly of a hydrolyzed and condensed product of the compound (L). Preferably, the ratio (volume ratio) of [the island phase (Q2)/the sea phase (Q1)] in the island phase (Q) is larger than that of [the island phase (P2)/the sea phase (P1)] in the sea phase (P). The diameter of the island phase (Q) is preferably in the range of 30 nm to 1200 nm, more preferably in the range of 50 to 500 nm, and further preferably in the range of 50 nm to 400 nm. The diameters of the island phase (P2) and the island phase (Q2) are preferably 50 nm or shorter, more preferably 30 nm or shorter, and further preferably 20 nm or shorter.

In order to obtain a structure such as the one mentioned above, suitable hydrolysis condensation of the compound (L) needs to occur prior to the crosslinking reaction between the compound (L) and a carboxylic acid-containing polymer. It therefore is possible to employ the following methods: using a specific compound (L) together with the carboxylic acid-containing polymer in a suitable ratio; allowing the compound (L) to be subjected to hydrolysis condensation before mixing it with the carboxylic acid-containing polymer; and using a suitable hydrolysis-condensation catalyst, for example.

Besides the base material and the gas barrier layer, the gas barrier layered product of the present invention also may include another layer (for example, a thermoplastic resin film or paper). With the addition of such another layer, the gas barrier layered product can be provided with a heat-sealing property or can have improved dynamic properties.

Specific examples of the gas barrier layered product of the present invention in the case of using a thermoplastic resin film or paper (a layer) for the base material are indicated below. In the following specific examples, in order to simplify the description, the word "film (layer)" may be omitted and only materials thereof may be indicated in some cases.

Examples of the structure of the gas barrier layered product according to the present invention include: gas barrier layer/polyester/polyamide/polyolefin, gas barrier layer/polyester/gas barrier layer/polyamide/polyolefin, polyester/gas barrier layer/polyamide/polyolefin, gas barrier layer/polyamide/polyester/polyolefin, gas barrier layer/polyamide/gas barrier layer/polyester/polyolefin, polyamide/gas barrier layer/polyester/polyolefin, gas barrier layer/polyolefin/polyamide/polyolefin, gas barrier layer/polyolefin/gas barrier layer/polyamide/polyolefin, polyolefin/gas barrier layer/polyamide/polyolefin, gas barrier layer/polyolefin/polyolefin, gas barrier layer/polyolefin/gas barrier layer/polyolefin, polyolefin/gas barrier layer/polyolefin, gas barrier layer/polyester/polyolefin, gas barrier layer/polyester/gas barrier layer/polyolefin, polyester/gas barrier layer/polyolefin, gas barrier layer/polyamide/polyolefin, gas barrier layer/polyamide/gas barrier layer/polyolefin, polyamide/gas barrier layer/polyolefin, gas barrier/polyester/paper, gas barrier layer/polyamide/paper, gas barrier layer/polyolefin/paper, polyethylene (PE) layer/paper layer/PE layer/gas barrier layer/polyethylene terephthalate (PET) layer/PE layer, polyethylene (PE) layer/paper layer/PE layer/gas barrier layer/polyamide layer/PE layer, PE layer/paper layer/PE layer/gas barrier layer/PE, paper layer/PE layer/gas barrier layer/PET layer/PE layer, PE layer/paper layer/gas barrier layer/PE layer, paper layer/gas barrier layer/PET layer/PE layer, paper layer/gas barrier layer/PE layer, gas barrier layer/paper layer/PE layer, gas barrier layer/PET layer/paper layer/PE layer, PE layer/paper layer/PE layer/gas barrier layer/PE layer/hydroxyl group-containing polymer layer, PE layer/paper layer/PE layer/gas barrier layer/PE layer/polyamide layer, PE layer/paper layer/PE layer/gas barrier layer/PE layer/polyester layer, etc. From the viewpoints of the heat-sealing property and dynamic property of the gas barrier layered product, polypropylene or polyethylene is preferable as the polyolefin, polyethylene terephthalate (PET) is preferable as the polyester, and nylon 6 is preferable as the polyamide. Furthermore, an ethylene-vinyl alcohol copolymer is preferable as the hydroxyl group-containing polymer. Another layer, for example, a layer of an adhesive or an anchor coat layer may be provided between the respective layers, as required.

The packaging medium of the present invention is produced using the gas barrier layered product of the present invention described above. This packaging medium is applicable to various uses. This packaging medium is used preferably for the use where a barrier to gas such as oxygen gas is required. For example, the packaging medium of the present invention is used preferably as a packaging medium for a retort food. In addition, when a base material containing a paper layer is used, a paper container can be obtained.

Method for Producing Gas Barrier Layered Product

Hereinafter, the method for producing a gas barrier layered product of the present invention is described. According to this method, the gas barrier layered product of the present invention can be manufactured easily. The materials to be used in the production method of the present invention and the structure of the layered product are the same as those described above. Hence, the same descriptions may not be repeated in some cases.

In the production method of the present invention, first, a layer made of a composition is formed on a base material (the first process). The composition contains: a hydrolyzed and condensed product of at least one compound (L) containing a metal atom to which at least one characteristic group selected from a halogen atom and an alkoxy group has been bonded; and a polymer (a carboxylic acid-containing polymer) containing at least one functional group selected from a carboxyl group and a carboxylic anhydride group. The first process can be carried out, for example, through: a process of preparing a solution (S) that includes a carboxylic acid-containing polymer and at least one compound containing a metallic element selected from the compound (L), a partial hydrolysate of the compound (L), a total hydrolysate of the compound (L), a partial hydrolyzed and condensed product of the compound (L), and a product obtained through condensation of a part of a total hydrolysate of the compound (L); and a process of forming the layer containing the above-mentioned components by applying the solution (S) to the base material and then drying it. The solution (S) can be dried by removing the solvent contained in the solution (S).

When the carboxylic acid-containing polymer and the compound (L) that has not been subjected to hydrolysis condensation are mixed together, they may react with each other, which may make it difficult to apply the solution (S). Hence, it is preferable that the first process include: a process of forming a hydrolyzed and condensed product of the compound (L); a process of preparing the solution (S) containing the hydrolyzed and condensed product and a carboxylic acid-containing polymer; and a process of forming a gas barrier layer by applying the solution (S) to the base material and then drying it.

An organic group having at least one characteristic group selected from a halogen atom, a mercapto group, and a hydroxyl group further may be bonded to the metallic atom of the compound (L). That is, the compound (L) may contain the compound (L') described above. The use of the compound (L') makes it possible to obtain a layered product having a particularly good surface appearance.

In the carboxylic acid-containing polymer that is contained in the solution (S), as described above, a part (for example, 0.1 to 10 mol %) of the —COO— groups contained in the functional group (F) may have been neutralized with univalent ions.

Next, the layer formed on the base material is brought into contact with a solution containing metal ions with a valence of two or more (the second process; hereinafter this process also may be referred to as an "ionization process" in some cases). At least a part of the functional groups (F) (carboxylic acid and/or carboxylic anhydride) contained in the carboxylic acid-containing polymer in the layer is neutralized with divalent metal ions through the second process. In this case, the proportion (ionization degree) of the functional groups that are neutralized with the divalent metal ions can be adjusted by changing conditions such as the temperature of the solution containing the metal ions, the metal ion concentration, and the period of time of immersing the layer in the solution containing the metal ions.

The second process can be carried out by spraying the solution containing the metal ions with a valence of two or more on the layer that has been formed, or immersing both the base material and the layer formed on the base material in the solution containing the metal ions with a valence of two or more, for example.

In the below, the layered product obtained before the ionization process may be referred to as a "layered product (A)" while the layered product obtained after the ionization process may be referred to as a "layered product (B)" in some cases.

Hereinafter, the at least one compound containing a metallic element selected from the compound (L), a partial hydrolysate of the compound (L), a total hydrolysate of the compound (L), a partial hydrolyzed and condensed product of the compound (L), and a product obtained through condensation of a part of a total hydrolysate of the compound (L) may be referred to as a "compound (L) component". The solution (S) can be prepared using the compound (L) component, a carboxylic acid-containing polymer, and a solvent. For example, a method (1) can be employed in which the compound (L) component is added to a solvent in which a carboxylic-acid containing polymer has been dissolved, which then is mixed together. Furthermore, a method (2) also can be employed in which a compound (A) that is a compound (L) component is added to a solvent in which a carboxylic-acid containing polymer has been dissolved, and thereafter the compound (L) component is added thereto, which then is mixed together. Moreover, a method (3) also is employed in which an oligomer (one type of hydrolyzed and condensed product) is prepared from the compound (L) component in the presence of a solvent or in the absence of a solvent, and then a solution in which a carboxylic-acid containing polymer has been dissolved is mixed with the oligomer. The compound (L) component and the oligomer thereof may be added to a solvent individually or may be added to a solvent in the form of a solution in which they have been dissolved.

By using the above-mentioned preparation method (3) as a method of preparing the solution (S), a gas barrier layered product is obtained that has a particularly high gas barrier property. Hereinafter, the preparation method (3) is described further in detail.

The preparation method (3) includes: a process (St1) of preparing a solution by dissolving a carboxylic acid-containing polymer in a solvent; a process (St2) of preparing an oligomer by hydrolyzing and condensing the compound (L) component under specific conditions; and a process (St3) of mixing the solution obtained in the process (St1) and the oligomer obtained in the process (St2) together.

The solvent that is used for dissolving the carboxylic acid-containing polymer in the process (St1) can be selected according to the type of the carboxylic acid-containing polymer. For example, in the case of a water-soluble polymer such as polyacrylic acid and polymethacrylic acid, water is preferable. In the case of polymers such as an isobutylene-maleic anhydride copolymer and a styrene-maleic anhydride copolymer, water containing an alkaline material such as ammonia, sodium hydroxide, or potassium hydroxide is preferable. Moreover, in the process (St1), it is possible to use the following material together, as long as it does not hinder the carboxylic acid-containing polymer from dissolving: alcohols such as methanol, ethanol, etc.; ethers such as tetrahydrofuran, dioxane, trioxane, etc.; ketones such as acetone, methyl ethyl ketone, etc.; glycols such as ethylene glycols, propylene glycol, etc.; glycol derivatives such as methyl cellosolve, ethyl cellosolve, n-butyl cellosolve, etc.; glycerin; acetonitrile, dimethylformamide, dimethylsulfoxide, sulfolane, dimethoxyethane, etc.

In the process (St2), it is preferable that the oligomer is obtained by hydrolyzing and condensing the compound (L) component in a reaction system that includes the compound (L) component, an acid catalyst, water, and, if necessary, an organic solvent. Specifically, the technique that is used in a well-known sol-gel method is applicable. When the compound (L) is used as the compound (L) component, a gas barrier layered product with a further improved gas barrier property can be obtained.

The acid catalyst that is used in the process (St2) can be a well-known acid catalyst. Examples thereof include hydrochloric acid, sulfuric acid, nitric acid, p-toluenesulfonic acid, benzoic acid, acetic acid, lactic acid, butanoic acid, carbonic acid, oxalic acid, maleic acid, etc. Among them, hydrochloric acid, sulfuric acid, nitric acid, acetic acid, lactic acid, and butanoic acid are particularly preferable. A preferable amount of the acid catalyst to be used varies depending on the type of the catalyst to be used. However, with respect to 1 mol of metal atoms of the compound (L) component, the amount of the acid catalyst is preferably in the range of $1 \times 10^{-5}$ to 10 mol, more preferably in the range of $1 \times 10^{-4}$ to 5 mol, and further preferably in the range of $5 \times 10^{-4}$ to 1 mol. When the amount of the acid catalyst to be used is in this range, a gas barrier layered product with an excellent gas barrier property is obtained.

A preferable amount of water to be used in the process (St2) varies depending on the type of the compound (L) component. However, with respect to 1 mol of the alkoxy group or the halogen atoms (when the both are present together, 1 mol in total) of the compound (L) component, the amount of water to be used is preferably in the range of 0.05 to 10 mol, more preferably in the range of 0.1 to 4 mol, and further preferably in the range of 0.2 to 3 mol. When the amount of water to be used is in this range, a gas barrier layered product to be obtained has a particularly excellent gas barrier property. In the process (St2), when using a component containing water like hydrochloric acid, it is preferable that the amount of water to be used be determined in consideration of the quantity of water to be introduced by the component.

Furthermore, in the reaction system of the process (St2), an organic solvent may be used if needed. The organic solvent to be used is not particularly limited, as long as the compound (L) component is dissolved therein. For example, alcohols, such as methanol, ethanol, isopropanol, normal propanol, etc. can be used suitably as the organic solvent. Alcohol having a molecular structure (an alkoxy component) of the same type as that of the alkoxy group that is contained in the compound (L) component is used further suitably. Specifically, methanol is preferable with respect to tetramethoxysilane, while ethanol is preferable with respect to tetraethoxysilane. The amount of the organic solvent to be used is not particularly limited. Preferably, however, it allows the concentration of the compound (L) component to be 1 to 90 wt %, more preferably 10 to 80 wt %, and further preferably 10 to 60 wt %.

In the process (St2), the temperature of the reaction system that is employed when the compound (L) component is hydrolyzed and condensed in the reaction system is not necessarily limited. However, the temperature of the reaction system is generally in the range of 2 to 100° C., preferably in the range of 4 to 60° C., and more preferably in the range of 6 to 50° C. The reaction time varies depending on the reaction conditions such as the quantity and type of the catalyst. It, however, is generally in the range of 0.01 to 60 hours, preferably in the range of 0.1 to 12 hours, and more preferably in the range of 0.1 to 6 hours. The atmosphere of the reaction system also is not necessarily limited. The atmosphere to be employed herein can be an air atmosphere, a carbon dioxide atmosphere, an argon atmosphere, or a nitrogen gas stream atmosphere.

In the process (St2), all amount of the compound (L) component may be added to the reaction system at once, or the compound (L) component may be added to the reaction system little by little over time. In both the cases, it is preferable that the total amount of the compound (L) component to be used satisfy the above-mentioned suitable range. When the oligomer that is prepared in the process (St2) is indicated in terms of the above-mentioned condensation degree P, it is preferable that it have a condensation degree of approximately 25 to 60%.

In the process (St3), the solution (S) is prepared by mixing the oligomer that is derived from the compound (L) component and a solution including a carboxylic acid-containing polymer together. From the viewpoints of the preservation stability of the solution (S) and the gas barrier property of the gas barrier layered product to be obtained, the pH of the solution (S) is preferably in the range of 1.0 to 7.0, more preferably in the range of 1.0 to 6.0, and further preferably in the range of 1.5 to 4.0.

The pH of the solution (S) can be adjusted by a well-known method. For example, it can be adjusted by adding: an acid compound such as hydrochloric acid, nitric acid, sulfuric acid, phosphoric acid, acetic acid, butanoic acid, ammonium sulfate, etc.; and a basic compound such as sodium hydroxide, potassium hydroxide, ammonia, trimethylamine, pyridine, sodium carbonate, sodium acetate, etc. In this case, when using a basic compound that introduces univalent positive ions into the solution, an effect can be obtained that a part of the carboxyl group and/or carboxylic anhydride group of the carboxylic acid-containing polymer can be neutralized by the univalent ions.

The state of the solution (S) that is prepared in the process (St3) changes with the passage of time and finally the solution (S) becomes a gel composition. The period of time required for the solution (S) to become a gel state depends on the composition of the solution (S). In order to apply the solution (S) steadily to a base material, it is preferable that the solution (S) be one whose viscosity is stable over a long period of time and then increases gradually. Preferably, the composition of the solution (S) is adjusted so that its viscosity measured with a Brookfield viscometer (a B-type viscosity meter: 60 rpm) is 1 N·s/m² or lower (more preferably 0.5 N·s/m² or lower, and particularly preferably 0.2 N·s/m² or lower) even after the solution (S) is allowed to stand still at 25° C. for two days, with the time when all the amount of compound (L) component has been added being taken as a reference point. Furthermore, it is more preferable that the composition of the solution (S) be adjusted so that its viscosity is 1 N·s/m$^2$ or lower (more preferably 0.1 N·s/m$^2$ or lower, and particularly preferably 0.05 N·s/m$^2$ or lower) even after the solution (S) is allowed to stand still at 25° C. for ten days. Further preferably, the composition of the solution (S) is adjusted so that its viscosity is 1 N·s/m$^2$ or lower (more preferably 0.1 N·s/m$^2$ or lower, and particularly preferably 0.05 N·s/m$^2$ or lower) even after the solution (S) is allowed to stand still at 50° C. for ten days. When the viscosity of the solution (S) is in the above-mentioned ranges, the solution (S) is excellent in storage stability and the gas barrier layered product to be obtained has an improved gas barrier property in many cases.

In order to adjust the composition so that the viscosity of the solution (S) is in the above-mentioned ranges, the methods that can be employed herein are, for example, adjusting the concentration of the solid content, adjusting the pH, and adding a viscosity modifier such as carboxymethyl cellulose, starch, bentonite, tragacanth gum, stearate, alginate, methanol, ethanol, n-propanol, isopropanol, etc.

In order to facilitate the application of the solution (S) to the base material, an organic solvent that can be mixed with the solution (S) uniformly may be added to the solution (S) in the range in which the stability of the solution (S) is not impaired. Examples of the organic solvent that can be added include: lower alcohols such as methanol, ethanol, n-propanol, isopropanol, etc.; ethers such as tetrahydrofuran, dioxane, trioxane, etc.; ketones such as acetone, methyl ethyl ketone, methyl vinyl ketone, methyl isopropyl ketone, etc.; glycols such as ethylene glycol, propylene glycol, etc.; glycol derivatives such as methyl cellosolve, ethyl cellosolve, n-butyl cellosolve, etc.; glycerin; acetonitrile, dimethylformamide, dimethylacetamide, dimethylsulfoxide, sulfolane, dimethoxyethane, etc.

In the range in which the effects of the present invention are not impaired, the solution (S) also may include, if desired: inorganic acid-metal salt such as carbonate, hydrochloride, nitrate, hydrogen carbonate, sulfate, hydrogen sulfate, phosphate, borate, aluminate, etc.; organic acid-metal salt such as oxalate, acetate, tartrate, stearate, etc.; a metal complex such as an acetylacetonato metal complex like aluminum acetylacetonato, a cyclopentadienyl metal complex like titanocene, a cyano metal complex, etc.; a layered clay compound, a crosslinker, the above-mentioned polyalcohols, high molecular compounds other than those, a plasticizer, an antioxidant, an ultraviolet absorber, flame retardant, etc. The solution (S) also may include fine powder of the metal oxide produced by hydrolyzing and condensing the above-mentioned metal alkoxide by a wet process; fine powder of the metal oxide produced by hydrolyzing, condensing, or burning metal alkoxide by a dry process; or fine silica powder prepared from water glass, for example.

With respect to the amount of polyalcohols to be added to the solution (S), the weight ratio of the carboxylic acid-containing polymer/the polyalcohols is preferably in the range of 10/90 to 99.5/0.5. The weight ratio is more preferably in the range of 30/70 to 99/1, further preferably 50/50 to 99/1, and most preferably 70/30 to 98/2.

The solution (S) prepared in the process (St3) is applied to at least one surface of the base material. Before the application of the solution (S), the surface of the base material may be treated with a well-known anchor coating agent, or a well-known adhesive may be applied to the surface of the base material. The method of applying the solution (S) to the base material is not particularly limited and a well-known method therefore can be employed. Preferable examples of the method include a cast method, a dipping method, a roll coating method, a gravure coating method, a screen printing method, a reverse coating method, a spray coating method, a kit coating method, a die coating method, a metering bar coating method, a chamber doctor coating method, a curtain coating method, etc.

After the application of the solution (S) to the base material, the solvent contained in the solution (S) is removed and thereby a layered product (a layered product (A)) in the state before being subjected to the ionization process is obtained. The method of removing the solvent is not particularly limited and a well-known method therefore can be used. Specifically, methods such as a hot-air drying method, a hot roll contact method, an infrared heating method, a microwave heating method, etc. can be used individually or in combination. The drying temperature is not particularly limited as long as it is lower than the flow start temperature of the base material by at least 15 to 20° C. and also is lower than the thermal decomposition start temperature of the carboxylic acid-containing polymer by at least 15 to 20° C. The drying temperature is preferably in the range of 80° C. to 200° C., more preferably in the range of 100 to 180° C., and further preferably in the range of 110 to 180° C. The solvent can be removed under either a normal pressure or a reduced pressure.

The layered product (A) obtained through the above-mentioned process is brought into contact with a solution (hereinafter also referred to as a "solution (MI) in some cases) containing metal ions with a valence of two or more (ionization process). Thus, the gas barrier layered product of the present invention is obtained. The ionization process may be carried out in any stage, as long as the effects of the present invention are not impaired. The ionization process can be carried out before or after the layered product is processed into the form of a packaging material, or after the packaging material is filled with contents and then is sealed, for example.

The solution (MI) can be prepared by dissolving, in a solvent, a compound (a polyvalent metal compound) that releases the metal ions with a valence of two or more upon dissolution. The solvent to be used for preparing the solution (MI) is desirably water but may be a mixture of water and an organic solvent that can be mixed with water. Examples of such a solvent include organic solvents of: lower alcohols such as methanol, ethanol, n-propanol, isopropanol, etc.; ethers such as tetrahydrofuran, dioxane, trioxane, etc.; ketones such as acetone, methyl ethyl ketone, methyl vinyl ketone, methyl isopropyl ketone, etc.; glycols such as ethylene glycol, propylene glycol, etc.; glycol derivatives such as methyl cellosolve, ethyl cellosolve, n-butyl cellosolve, etc.; glycerin; acetonitrile, dimethylformamide, dimethylacetamide, dimethylsulfoxide, sulfolane, dimethoxyethane, etc.

The polyvalent metal compound to be used herein can be a compound that releases metal ions (i.e. metal ions with a valence of two or more) described as examples with respect to the gas barrier layered product of the present invention. Examples thereof include: calcium acetate, calcium hydroxide, barium hydroxide, calcium chloride, calcium nitrate, calcium carbonate, magnesium acetate, magnesium hydroxide, magnesium chloride, magnesium carbonate, iron(II) acetate, iron(II) chloride, iron(III) acetate, iron(III) chloride, zinc acetate, zinc chloride, copper(II) acetate, copper(III) acetate, lead acetate, mercury(II) acetate, barium acetate, zirconium acetate, barium chloride, barium sulfate, nickel sulfate, lead sulfate, zirconium chloride, zirconium nitrate, aluminum sulfate, potassium alum (KAl (SO$_4$)$_2$), titanium(IV) sulfate, etc. Only one of the polyvalent metal compounds may be used or two or more of them may be used in combination. Preferable examples of the polyvalent metal compound include calcium acetate, calcium hydroxide, magnesium acetate, zinc acetate, and barium acetate. These polyvalent metal compounds may be used in the form of a hydrate.

The concentration of the polyvalent metal compound in the solution (MI) is not particularly limited. It, however, is preferably in the range of $5 \times 10^{-4}$ wt % to 50 wt %, more preferably in the range of $1 \times 10^{-2}$ wt % to 30 wt %, and further preferably in the range of 1 wt % to 20 wt %.

When the layered product (A) is brought into contact with the solution (MI), the temperature of the solution (MI) is not particularly limited. However, the higher the temperature, the higher the ionization rate of the carboxyl group-containing polymer. Preferable temperature is, for example, in the range of 30 to 140° C. The temperature is preferably in the range of 40° C. to 120° C., more preferably in the range of 50° C. to 100° C.

Desirably, after the layered product (A) is brought into contact with the solution (MI), the solvent that has remained on the layered product is removed. The method of removing the solvent is not particularly limited. A well-known method can be used. Specifically, drying techniques such as a hot-air drying method, a hot roll contact method, an infrared heating method, a microwave heating method, etc. can be used individually or two or more of them can be used in combination. The temperature at which the solvent is removed is not particularly limited as long as it is lower than the flow start temperature of the base material by at least 15 to 20° C. and also is lower than the thermal decomposition start temperature of the carboxylic acid-containing polymer by at least 15 to 20° C. The drying temperature is preferably in the range of 40° C. to 200° C., more preferably in the range of 40 to 150° C., and further preferably in the range of 40 to 100° C. The solvent can be removed under either a normal pressure or a reduced pressure.

In order not to impair the appearance of the surface of the gas barrier layered product, it is preferable that the superfluous polyvalent metal compound that has adhered to the surface of the layered product be removed before or after the solvent is removed. A preferable method of removing the polyvalent metal compound is washing using a solvent in which the polyvalent metal compound dissolves. A solvent that can be used for the solution (MI) can be employed as the solvent in which the polyvalent metal compound dissolves. It is preferable that the same solvent as that of the solution (MI) be used.

The production method of the present invention further may include a process of heat-treating the layer formed in the first process at a temperature of 120 to 240° C., after the first process and before and/or after the second process. In other words, the layered product (A) or (B) may be heat-treated. The heat treatment can be carried out at any stage after the solvent of the solution (S) that had been applied has been removed substantially. However, when the layered product (i.e. the layered product (A)) is heat-treated before being subjected to the ionization process, a gas barrier layered product with a good surface appearance is obtained. The temperature that is employed for the heat treatment is preferably in the range of 120° C. to 240° C., more preferably in the range of 130° C. to 230° C., and further preferably in the range of 150° C. to 210° C. The heat treatment can be carried out in air, a nitrogen atmosphere, an argon atmosphere, etc.

In the production method of the present invention, the layered product (A) or (B) may be irradiated with ultraviolet rays. The ultraviolet irradiation may be carried out anytime after the solvent of the solution (S) that had been applied has been removed substantially. The method of the ultraviolet irradiation is not particularly limited. A well-know method can be used herein. The wavelengths of the ultraviolet rays that are used for the irradiation are preferably in the range of 170 to 250 nm, more preferably in the range of 170 to 190 nm and/or in the range of 230 to 250 nm. Furthermore, instead of the ultraviolet irradiation, irradiation may be carried out with radial rays such as electron rays, gamma rays, etc.

Only either of the heat treatment and the ultraviolet irradiation may be carried out, or the both may be employed together. When the heat treatment and/or the ultraviolet irradiation are/is carried out, the layered product may exhibit a further improved gas barrier property in some cases.

When the surface of the base material is subjected to a treatment (a treatment to be carried out using an anchor coating agent, or application of an adhesive) before the application of the solution (S) in order to dispose the adhesive layer (T) between the base material and the gas barrier layer, it is preferable that a maturing process in which the base material to which the solution (S) has been applied is allowed to stand at a relatively lower temperature for a long period of time be carried out after the first process (the application of the solution (S)) but before the above-mentioned heat treatment and the second process (the ionization process). The temperature that is employed for the maturing process is preferably 30 to 200° C., more preferably 30 to 150° C., and further preferably 30 to 120° C. The period of time for which the maturing process is carried out is preferably in the range of 0.5 to 10 days, more preferably in the range of 1 to 7 days, and further preferably 1 to 5 days. When such a maturing process is carried out, the adhesiveness between the base material and the gas barrier layer further improves. It is preferable that the above-mentioned heat treatment (the heat treatment at 120° C. to 240° C.) further be carried out after this maturing process.

The gas barrier layered product of the present invention has an excellent barrier property with respect to gases such as oxygen, water vapor, carbon dioxide, nitrogen, etc. It can maintain an excellent barrier property to a greater extent even under a high humidity condition or after it is subjected to a bending condition. In addition, even after it is subjected to retort processing, it exhibits an excellent gas barrier property. Thus, the gas barrier layered product of the present invention has a good gas barrier property that does not depend on the environmental conditions such as humidity, and it exhibits an excellent gas barrier property even after it is subjected to bending conditions. It therefore is applicable to various uses. For instance, the gas barrier layered product of the present invention is particularly useful as a food packaging material (particularly a packaging material for retort foods). The gas barrier layered product of the present invention also can be used as a material for packaging chemicals such as agricultural chemicals and medicines, industrial materials such as precision materials, garments, etc.

EXAMPLES

Hereinafter, the present invention is described further in detail using examples. The present invention, however, is not limited by the examples.

The measurements and evaluations that were carried out in the following examples were performed by the following methods (1) to (8). Some of the abbreviations that are used in the following description about measurement methods and evaluation methods may be described later. The measurement results and evaluation results are indicated in the tables that appear after the descriptions of the examples and comparative examples.

(1) Storage Stability

Examples 1 to 21 and Comparative Examples 1 to 3

After the solution (S) to be used for forming a gas barrier layer was prepared (in the examples of the present invention, after the addition of the compound (L) component to an aqueous solution of polyacrylic acid had been completed), it was allowed to stand still at 25° C. for two days. The viscosity of this solution was measured using the Brookfield viscometer (a B-type viscometer, the revolution speed: 60 rpm) before and after it was allowed to stand. The rate of increase in viscosity was calculated from the initial viscosity and that obtained after two days. The method of determining the storage stability of the solution (S) of Examples 23 to 28 is described in Example 23.

(2) Oxygen Barrier Property

With respect to the layered product having a specified structure, the oxygen transmission rate was measured using an oxygen transmission rate test system ("MOCON OX-TRAN 10/50", manufactured by Modern Controls, Inc.). Specifically, the layered product was set in such a manner that the gas barrier layer faced the oxygen supply side and OPET (in an example 11, the other gas barrier layer) faced the career gas side. Then the oxygen transmission rate (unit: $cm^3/m^2 \cdot day \cdot atm$) was measured under conditions including a temperature of 20° C., an oxygen pressure of 1 atm, and a career gas pressure of 1 atm. For the measurement, three humidity conditions, specifically, 65% RH, 85% RH, and 95% RH, were employed. The oxygen supply side and the career gas side had the same humidity. In Examples 23 to 28, the measurement was carried out with the humidity set at 85% RH.

(3) Oxygen Barrier Property after Retort Processing

Two layered products (with a size of 12 cm×12 cm) having a specified structure were produced. Then the two layered products were stacked together in such a manner that their gas barrier layers faced the outside. Thereafter, three sides of the layered products were heat-sealed by 5 mm from the edges thereof. Distilled water 80 g was poured between the two layered products that had been heat-sealed and then the remaining fourth side was heat-sealed in the same manner. Thus, a pouch containing the distilled water therein was produced.

Subsequently, the pouch was immersed in tap water or ion-exchanged water that filled an autoclave, and thereby retort processing was carried out at 120° C. for 30 minutes. After the retort processing, heating was stopped. At the time when the inner temperature decreased to 60° C., the pouch was removed from the autoclave. Thereafter, the pouch was allowed to stand for one hour in a room having a temperature of 20° C. and a humidity adjusted to 85% RH. Then, the portion that had been heat-sealed was cut off with scissors, and water that had adhered to the surfaces of the gas barrier layered products was wiped off by lightly pressing a paper towel against the surfaces. Thereafter, the pouch was allowed to stand for one week in a room having a temperature of 20° C. and a humidity adjusted to 85% RH. Then the oxygen transmission rate of the layered product thus obtained was measured and thereby the oxygen barrier property after the retort processing was evaluated.

The oxygen transmission rate was measured using the oxygen transmission rate test system ("MOCON OX-TRAN 10/50", manufactured by Modern Controls, Inc.). Specifically, the layered product was set in such a manner that a gas barrier layer faced the oxygen supply side and PP faced the career gas side. Then, the oxygen transmission rate (unit: $cm^3/m^2 \cdot day \cdot atm$) was measured under conditions including a temperature of 20° C., a relative humidity on the oxygen supply side of 85%, a relative humidity on the carrier gas side of 100%, an oxygen pressure of 1 atm, and a career gas pressure of 1 atm. The concentration of the calcium metal contained in the tap water used for the retort processing was 15 ppm. Furthermore, the absence of metal atoms in the ion-exchanged water was confirmed. In the following examples and comparative examples, the retort processing was carried out using tap water unless otherwise specified. The concentration of calcium contained in the tap water used in the retort processing was 15 ppm (4) Tensile Strength and Elongation A sample with a size of 1.5 cm×1.5 cm was cut out of the layered product produced for evaluating the above-mentioned item, (2) Oxygen Barrier Property. With respect to the sample, its tensile strength and elongation were measured by a method that was in conformity with JIS K7127.

(5) Dropped Bag Breaking Strength

Using the pouch that was produced for evaluating the above-mentioned item, (3) Oxygen Barrier Property after Retort Processing, the dropped bag breaking strength was determined. That is, a pouch was subjected to the same retort processing as that carried out for the evaluation in the above-mentioned item (3). Thereafter, the pouch was removed from the autoclave and then was allowed to stand for one hour in a room having a temperature of 20° C. and a humidity adjusted to 85% RH. This pouch was lifted to a height of 1.5 m in such a manner as to be in parallel with the floor surface and then was dropped. The pouch was dropped repeatedly until it was broken to allow water to leak from the inside. Thus, the number of times it was dropped before the water leaked was determined. With respect to one type of layered product, ten pouches were prepared. The average of the numbers of times the ten pouches were dropped was taken as a value of the dropped bag breaking strength.

(6) Surface Appearance

Examples 1 to 22 and Comparative Examples 1 to 3

With respect to the layered product produced for evaluating the above-mentioned item, (2) Oxygen Barrier Property, its transparency and surface condition such as irregularities of the gas barrier layer were observed visually. Then the case where it was transparent and the surface was smooth was judged as "excellent (AA)", the case where it was slightly hazy but had no problem practically and a good surface condition was judged as "good (A)", and the case where it was not transparent or the surface condition was not good due to, for example, irregularities caused at the surface was judged as "poor (B)".

(7) Neutralization Degree (Ionization Degree) of Carboxyl Group with Metal Ions

With respect to the layered product produced for evaluating the above-mentioned item, (2) Oxygen Barrier Property and the layered product obtained after the retort processing that was produced for evaluating the item, (3) Oxygen Barrier Property after Retort Processing, the peak of the stretching vibration of C=O that was contained in the gas barrier layer was observed in the mode of ATR (attenuated total reflection) using a Fourier Transform Infrared Spectrophotometer (manufactured by Shimadzu Corporation; 8200PC). The peak that was derived from the stretching vibration of C=O of the carboxyl group contained in the carboxylic acid-containing polymer before ionization was observed in the range of 1600 cm$^{-1}$ to 1850 cm$^{-1}$. The stretching vibration of C=O of the carboxyl group after ionization was observed in the range of 1500 cm$^{-1}$ to 1600 cm$^{-1}$. Then, the ratio thereof was calculated from the maximum absorbances in the respective ranges. Subsequently, the ionization degree was determined using the ratio and the analytical curve that was prepared beforehand by the following method.

[Preparation of Analytical Curve]

Polyacrylic acid with a number average molecular weight of 150,000 was dissolved in distilled water, and carboxyl groups were neutralized with a predetermined amount of sodium hydroxide. A base material was coated with an aqueous solution of the neutralized product of the polyacrylic acid thus obtained, in such a manner that the aqueous solution had the same thickness as that of the gas barrier layer of the layered product to be subjected to the measurement of ionization degree. This then was dried. The base material used herein was a drawn PET film (manufactured by Toray Industries, Inc.; Lumirror (Trade Name); Thickness: 12 µm; hereinafter abbreviated as "OPET" in some cases) whose surface was coated with a two-component anchor coating agent (manufactured by Mitsui Takeda Chemicals, Inc.; Takelac 3210 (Trade Name) and Takenate A3072 (Trade Name); hereinafter abbreviated as "AC" in some cases). Thus, 11 standard samples of layered products (each of which had a structure of a layer formed of a neutralized product of polyacrylic acid/AC/OPET) were produced. The 11 standard samples were different from each other in neutralization degree of the carboxyl groups, with the neutralization degree varying between 0 and 100 mol % by increments of 10 mol %. With respect to these samples, the infrared absorption spectrum was measured in the mode of ATR (attenuated total reflection) using a Fourier Transform Infrared Spectrophotometer (manufactured by Shimadzu Corporation; 8200PC). With respect to the two peaks corresponding to the stretching vibration of C=O that was contained in the layer formed of the neutralized product of polyacrylic acid, i.e. the peak observed in the range of 1600 cm$^{-1}$ to 1850 cm$^{-1}$ and the peak observed in the range of 1500 cm$^{-1}$ to 1600 cm$^{-1}$, the ratio between the maximum absorbances was calculated. Then using the ratios thus calculated and the ionization degrees of the respective standard samples, the analytical curve was prepared.

(8) Content of Inorganic Component

The content of the inorganic components of the gas barrier layer obtained before the ionization treatment was calculated by the method described above, i.e., the method of calculating it from the weight of the raw materials.

(9) Evaluation of Change in Appearance through Heating (Examples 14 to 21 and Comparative Example 3)

A layered product with a size of 10 cm×10 cm was produced. Then the four sides of the layered product were fixed to a wooden frame using a heat-resisting tape. The layered product fixed to the wooden frame was in a stretched state and was not loose. The layered product stuck on the wooden frame was allowed to stand still in a hot air drier whose internal temperature was 120° C., for five minutes. Subsequently, the layered product stuck on the wooden frame was taken out of the dryer and then was allowed to stand to cool in a room temperature atmosphere for ten minutes. Thereafter, the appearance of the layered product was observed. The appearance was evaluated in accordance with the following references:

AA: No change in appearance as compared to that observed before the layered product was placed in the hot air dryer;
A: Poor appearance was evident in few portions; and
B: Poor appearance was evident partially or throughout.

(10) Measurement of Peel Strength

The layered product having a structure of PET layer/AC layer/barrier layer/adhesive layer (1)/nylon layer/adhesive layer (2)/polypropylene layer was produced. This layered product was cut so as to have a width of 15 mm. T-type peel strength was measured at a tensile rate of 250 mm/min, with the separation plane being between the barrier layer and the adhesive layer (1).

(11) Measurement of Haze Value

Examples 14 to 21 and Comparative Example 3

A layered product with a size of 10 cm×10 cm was produced. With respect to the layered product, nine points were selected evenly and haze values thereof were measured. Equipment used for measuring haze values was HR-100 manufactured by Murakami Color Research Laboratory Co., Ltd. The Haze values were measured according to the specified measuring method (ASTM D1003-61). Then standard deviation was calculated from the measured values obtained at the nine points.

(12) Observation of Fine Structure of Gas Barrier Layer

A section of a layered product was coated with epoxy resin and a very thin section was produced using a device (Reichert ULTRACUT-S) manufactured by Leica. Then the section was observed using a transmission electron microscope (H-800NA) manufactured by Hitachi, Ltd.

(13) Storage Stability

Examples 23 to 28

After the solution (S) to be used for forming a gas barrier layer was prepared, specifically, after the addition of the compound (L) component to the aqueous solution of polyacrylic acid was completed, it was allowed to stand still at 25° C. Then the number of days that had passed until this solution stopped flowing completely was counted.

(14) Surface Appearance

Examples 23 to 28

With respect to the layered product produced for evaluating the above-mentioned item, (2) Oxygen Barrier Property, its haze value was measured according to the method of JIS K 7105 using a haze meter (HR-100; Murakami Color Research Laboratory, Inc.).

The haze value [(diffused light transmittance/total light transmittance)×100] is used as a typical index for evaluating the transparency of a material. Generally, it can be said that the lower the haze value, the higher the transparency of the material. The level of the haze value below which the material is considered to be satisfactorily transparent cannot simply be decided because the criteria for judgment thereof vary depending on uses. However, when the haze value is 3% or lower, the material can be used suitably even for uses where considerably high transparency is required.

Example 1

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained. With respect to this solution (S1), the storage stability was evaluated by the method described above.

On the other hand, a drawn PET film (OPET; Lumirror (Trade Name), manufactured by Toray Industries, Inc.) was coated with a two-component anchor coating agent (AC; Takelac 3210 (Trade Name) and Takenate A3072 (Trade Name), manufactured by Mitsui Takeda Chemicals, Inc.), which then was dried. Thus a base material (AC/OPET) having an anchor coat layer was produced. The anchor coat layer of the base material was coated with the solution (S1) using a bar coater in such a manner that the solution (S1) formed a layer with a thickness of 2 µm after being dried. This was dried at 80° C. for five minutes and then was subjected to a maturing process at 50° C. for three days (72 hours). Furthermore, this then was heat-treated in dry air at 200° C. for five minutes. Thus, a layered product (the gas barrier layer (2 µm)/AC/OPET (12 µm)) with a gas barrier layer that was transparent and colorless and had a good appearance was obtained (hereinafter, this layered product may be referred to as a "layered product (1)").

Next, calcium acetate was dissolved in distilled water in such a manner as to have a concentration of 10 wt %. This aqueous solution was kept warm at 80° C. Then, the layered product (1) obtained above was immersed in this aqueous solution (80° C.; MI-1) for approximately 20 seconds. Thereafter, this layered product was removed therefrom. Then the surfaces of the layered product were washed with distilled water whose temperature had been adjusted to 80° C. After that, it was dried at 80° C. for five minutes. Thus, a layered product (B-1) of the present invention was obtained. With respect to the layered product (B-1), the neutralization degree of the carboxyl groups of the polyacrylic acid contained in the gas barrier layer was determined by the aforementioned method. As a result, it was proved that 60 mol % of the carboxyl groups had been neutralized by calcium ions. With respect to the layered product (B-1) obtained in the above-mentioned manner, the oxygen barrier property, surface appearance, tensile strength and elongation, and content of inorganic components were evaluated by the aforementioned methods.

A sample with a size of 10 cm×10 cm was cut from the layered product (B-1), and the haze value thereof was measured by the aforementioned method. The value that was three times the standard deviation of the haze value was 0.20, which was considered to be an excellent value. Furthermore, the fine structure of the gas barrier layer was observed with a transmission electron microscope. The gas barrier layer had a sea-island structure that consisted of a sea phase (P) and an island phase (Q). The island phase (Q) had an ellipse shape, and the diameter of the ellipse was 50 to 500 nm in the major axis direction.

The sea phase (P) had a sea-island structure that consisted of a sea phase (P1) and an island phase (P2). The sea phase (P1) was formed mainly of the neutralized product of polyacrylic acid, while the island phase (P2) was formed mainly of the hydrolyzed and condensed product of tetramethoxysilane. The diameter of the island phase (P2) was approximately 20 nm or shorter.

The island phase (Q) had a sea-island structure that consisted of a sea phase (Q1) and an island phase (Q2). The sea phase (Q1) was formed mainly of the neutralized product of polyacrylic acid, while the island phase (Q2) was formed mainly of the hydrolyzed and condensed product of tetramethoxysilane. The diameter of the island phase (Q2) was approximately 20 nm or shorter. Judging from the picture obtained with the electron microscope, the sea phase (P) and the island phase (Q) were formed of the same components, but the island phase (Q) had a higher concentration of hydrolyzed and condensed product of tetramethoxysilane.

Furthermore, an drawn nylon film (Emblem (Trade Name), manufactured by Unitika, Ltd.; with a thickness of 15 µm; hereinafter may be abbreviated as "ONy" in some cases) and a polypropylene film (RXC-18 (Trade Name), manufactured by Tohcello Co., Ltd.; with a thickness of 50 µm; hereinafter may be abbreviate as "PP" in some cases) each were coated with a two-component adhesive (A-385 (Trade Name) and A-50 (Trade Name), manufactured by Mitsui Takeda Chemicals, Inc.), which then were dried. Then the films thus obtained were laminated with the above-mentioned layered product (B-1; gas barrier layer/AC/OPET). Thus, a layered product (B-1-1) that had a structure of gas barrier layer/AC/OPET/adhesive/ONy/adhesive/PP was obtained. With respect to this layered product, the dropped bag breaking strength, ionization degree after the retort processing, and oxygen transmission rate after the retort processing were measured. The ionization degree after the retort processing was 92 mol %, while the oxygen transmission rate after the retort processing was lower than 0.2 cm$^3$/m$^2$·day·atm. Thus, with respect to the both, the layered product exhibited excellent values.

Example 2

First, the layered product (1) described in Example 1 was produced. On the other hand, magnesium acetate was dissolved in distilled water in such a manner as to have a concentration of 10 wt %. Thus, an aqueous solution was prepared, and it was kept warm at 80° C. The layered product (1) was immersed in this aqueous solution (80° C.; MI-2) for approximately 20 seconds. Thereafter, this layered product was removed therefrom. Then the surfaces of the layered product were washed with distilled water whose temperature had been adjusted to 80° C. After that, it was dried at 80° C. for five minutes. Thus, a layered product (B-2) of the present invention was obtained. With respect to the layered product (B-2), the neutralization degree of the carboxyl groups of the polyacrylic acid contained in the gas barrier layer was determined by the aforementioned method. As a result, it was proved that 64 mol % of the carboxyl groups had been neutralized by magnesium ions. In addition, with respect to the layered product (B-2), the oxygen barrier property, surface appearance, tensile strength and elongation, and content of inorganic components were evaluated by the aforementioned methods.

Furthermore, using the layered product (B-2), a layered product (B-2-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 88 mol %, while the oxygen transmission rate after the retort processing was lower than 0.2 $cm^3/m^2 \cdot day \cdot atm$. Thus, with respect to the both, the layered product exhibited excellent values.

Example 3

First, the layered product (1) described in Example 1 was produced. On the other hand, zinc acetate was dissolved in distilled water in such a manner as to have a concentration of 10 wt %. Thus, an aqueous solution was prepared, and it was kept warm at 80° C. The layered product (1) was immersed in this aqueous solution (80° C.; MI-3) for approximately 20 seconds. Thereafter, this layered product was removed therefrom. Then the surfaces of the layered product were washed with distilled water whose temperature had been adjusted to 80° C. After that, it was dried at 80° C. for five minutes. Thus, a layered product (B-3) of the present invention was obtained. With respect to the layered product (B-3), the neutralization degree of the carboxyl groups of the polyacrylic acid contained in the gas barrier layer was determined by the aforementioned method. As a result, it was proved that 60 mol % of the carboxyl groups had been neutralized by zinc ions. In addition, with respect to the layered product (B-3), the oxygen barrier property, surface appearance, tensile strength and elongation, and content of inorganic components were evaluated by the aforementioned methods.

Furthermore, using the layered product (B-3), a layered product (B-3-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 90 mol %, while the oxygen transmission rate after the retort processing was lower than 0.2 $cm^3/m^2 \cdot day \cdot atm$. Thus, with respect to the both, the layered product exhibited excellent values.

Example 4

Polyacrylic acid (PAA) with a number average molecular weight of 150,000 was dissolved in distilled water, and thereby a polyacrylic acid aqueous solution was obtained, in which the solid content concentration was 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S4) was obtained. With respect to this solution (S4), the storage stability was evaluated by the method described above.

Next, a layered product (4) that had a structure of gas barrier layer (2 μm)/AC/OPET (12 μm) was produced by the same method as in Example 1 except that the solution (S4) was used instead of the solution (S1). The gas barrier layer of the layered product (4) was transparent and colorless and had a good surface appearance.

Next, the layered product (4) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-4) of the present invention was obtained. With respect to the layered product (B-4), the neutralization degree of the carboxyl groups of the polyacrylic acid contained in the gas barrier layer was determined by the aforementioned method. As a result, it was proved that 63 mol % of the carboxyl groups had been neutralized by calcium ions. With respect to the layered product (B-4), the oxygen barrier property, surface appearance, tensile strength and elongation, and content of inorganic components were evaluated by the aforementioned methods.

Furthermore, using the layered product (B-4), a layered product (B-4-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 92 mol %, while the oxygen transmission rate after the retort processing was lower than 0.2 $cm^3/m^2 \cdot day \cdot atm$. Thus, with respect to the both, the layered product exhibited excellent values.

Example 5

Polyacrylic acid (PAA) with a number average molecular weight of 150,000 was dissolved in distilled water, and thereby a polyacrylic acid aqueous solution was obtained, in which the solid content concentration was 10 wt %.

Next, 60.8 parts by weight of tetramethoxysilane (TMOS) was dissolved in 88.0 parts by weight of methanol. Subsequently, 27.2 parts by weight of gamma-glycidoxypropyltrimethoxysilane was dissolved therein. Thereafter, 5.20 parts by weight of distilled water and 12.9 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 239 parts by weight of distilled water, which then was added promptly to 567 parts by weight of the above-mentioned 10-wt % polyacrylic acid aqueous solution that was being stirred. Thus a solution (S5)

was obtained. With respect to this solution (S5), the storage stability was evaluated by the method described above.

Next, a layered product (5) that had a structure of gas barrier layer (2 μm)/AC/OPET (12 μm) was produced by the same method as in Example 1 except that the solution (S5) was used instead of the solution (S1). The gas barrier layer of the layered product (5) was transparent and colorless and had a good surface appearance.

Next, the layered product (5) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-5) of the present invention was obtained. With respect to the layered product (B-5), the neutralization degree of the carboxyl groups of the polyacrylic acid contained in the gas barrier layer was determined by the aforementioned method. As a result, it was proved that 55 mol % of the carboxyl groups had been neutralized by calcium ions. With respect to the layered product (B-5), the oxygen barrier property, surface appearance, tensile strength and elongation, and content of inorganic components were evaluated by the aforementioned methods.

Furthermore, using the layered product (B-5), a layered product (B-5-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 87 mol %, while the oxygen transmission rate after the retort processing was lower than 0.2 $cm^3/m^2 \cdot day \cdot atm$. Thus, with respect to the both, the layered product exhibited excellent values.

Example 6

Polyacrylic acid (PAA) with a number average molecular weight of 150,000 was dissolved in distilled water, and thereby a polyacrylic acid aqueous solution was obtained, in which the solid content concentration was 10 wt %.

Next, 36.3 parts by weight of gamma-glycidoxypropyltrimethoxysilane was dissolved in 36.3 parts by weight of methanol. Thereafter, 1.55 parts by weight of distilled water and 3.84 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 179 parts by weight of distilled water, which then was added promptly to 743 parts by weight of the above-mentioned 10-wt % polyacrylic acid aqueous solution that was being stirred. Thus a solution (S6) was obtained. With respect to this solution (S6), the storage stability was evaluated by the method described above.

Next, a layered product (6) that had a structure of gas barrier layer (2 μm)/AC/OPET (12 μm) was produced by the same method as in Example 1 except that the solution (S6) was used instead of the solution (S1). The gas barrier layer of the layered product (6) was transparent and colorless and had a good surface appearance.

Next, the layered product (6) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-6) of the present invention was obtained. With respect to the layered product (B-6), the neutralization degree of the carboxyl groups of the polyacrylic acid contained in the gas barrier layer was determined by the aforementioned method. As a result, it was proved that 70 mol % of the carboxyl groups had been neutralized by calcium ions. With respect to the layered product (B-6), the oxygen barrier property, surface appearance, and content of inorganic components were evaluated by the aforementioned methods.

Furthermore, using the layered product (B-6), a layered product (B-6-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 95 mol %, while the oxygen transmission rate after the retort processing was lower than 0.2 $cm^3/m^2 \cdot day \cdot atm$. Thus, with respect to the both, the layered product exhibited excellent values.

Example 7

Polyacrylic acid (PAA) with a number average molecular weight of 150,000 was dissolved in distilled water, and thereby a polyacrylic acid aqueous solution was obtained, in which the solid content concentration was 10 wt %.

Next, 45.6 parts by weight of tetramethoxysilane (TMOS) was dissolved in 54.6 parts by weight of methanol. Subsequently, 9.07 parts by weight of gamma-glycidoxypropyltrimethoxysilane was dissolved therein. Thereafter, 3.42 parts by weight of distilled water and 8.44 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 123 parts by weight of distilled water, which then was added promptly to 756 parts by weight of the above-mentioned 10-wt % polyacrylic acid aqueous solution that was being stirred. Thus a solution (S7) was obtained. With respect to this solution (S7), the storage stability was evaluated by the method described above.

Next, a layered product (7) that had a structure of gas barrier layer (2 μm)/AC/OPET (12 μm) was produced by the same method as in Example 1 except that the solution (S7) was used instead of the solution (S1). The gas barrier layer of the layered product (7) was transparent and colorless and had a good surface appearance.

Next, the layered product (7) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. Thus, a layered product (B-7) of the present invention was obtained. With respect to the layered product (B-7), the neutralization degree of the carboxyl groups of the polyacrylic acid contained in the gas barrier layer was determined by the aforementioned method. As a result, it was proved that 67 mol % of the carboxyl groups had been neutralized by calcium ions. With respect to the layered product (B-7), the oxygen barrier property, surface appearance, tensile strength and elongation, and content of inorganic components were evaluated by the aforementioned methods.

Furthermore, using the layered product (B-7), a layered product (B-7-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 93 mol %, while the oxygen transmission rate after the retort processing was lower than 0.2 cm$^3$/m$^2$·day·atm. Thus, with respect to the both, the layered product exhibited excellent values.

Example 8

Polyacrylic acid (PAA) with a number average molecular weight of 150,000 was dissolved in distilled water, and thereby a polyacrylic acid aqueous solution was obtained, in which the solid content concentration was 10 wt %.

Next, 68.4 parts by weight of tetramethoxysilane (TMOS) was dissolved in 78.7 parts by weight of methanol. Subsequently, 10.3 parts by weight of gamma-aminopropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 158 parts by weight of distilled water, which then was added promptly to 667 parts by weight of the above-mentioned 10-wt % polyacrylic acid aqueous solution that was being stirred. Thus a solution (S8) was obtained. With respect to this solution (S8), the storage stability was evaluated by the method described above.

Next, a layered product (8) that had a structure of gas barrier layer (2 μm)/AC/OPET (12 μm) was produced by the same method as in Example 1 except that the solution (S8) was used instead of the solution (S1). The gas barrier layer of the layered product (8) was transparent and colorless and had a good surface appearance.

Next, the layered product (8) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-8) of the present invention was obtained. With respect to the layered product (B-8), the neutralization degree of the carboxyl groups of the polyacrylic acid contained in the gas barrier layer was determined by the aforementioned method. As a result, it was proved that 62 mol % of the carboxyl groups had been neutralized by calcium ions. With respect to the layered product (B-8), the oxygen barrier property, surface appearance, tensile strength and elongation, and content of inorganic components were evaluated by the aforementioned methods.

Furthermore, using the layered product (B-8), a layered product (B-8-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 88 mol %, while the oxygen transmission rate after the retort processing was lower than 0.2 cm$^3$/m$^2$·day·atm. Thus, with respect to the both, the layered product exhibited excellent values.

Example 9

Polyacrylic acid (PAA) with a number average molecular weight of 150,000 and polyvinyl alcohol (PVA-105 (Trade Name), manufactured by KURARAY CO., LTD.; with a viscosity average degree of polymerization of 500) were dissolved in distilled water in such a manner that the weight ratio therebetween was 97:3. Subsequently, ammonia water was added thereto to neutralize 1.5 mol % of the carboxyl groups of the polyacrylic acid. Thus, an aqueous polymer solution containing polyacrylic acid and polyvinyl alcohol was obtained, in which the solid content concentration was 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned aqueous polymer solution that was being stirred. Thus a solution (S9) was obtained. With respect to this solution (S9), the storage stability was evaluated by the method described above.

Next, a layered product (9) that had a structure of gas barrier layer (2 μm)/AC/OPET (12 μm) was produced by the same method as in Example 1 except that the solution (S9) was used instead of the solution (S1). The gas barrier layer of the layered product (9) was transparent and colorless and had a good surface appearance.

Next, the layered product (9) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-9) of the present invention was obtained. With respect to the layered product (B-9), the neutralization degree of the carboxyl groups of the polyacrylic acid contained in the gas barrier layer was determined by the aforementioned method. As a result, it was proved that 58 mol % of the carboxyl groups had been neutralized by calcium ions. With respect to the layered product (B-9), the oxygen barrier property, surface appearance, tensile strength and elongation, and content of inorganic components were evaluated by the aforementioned methods.

Furthermore, using the layered product (B-9), a layered product (B-9-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 91 mol %, while the oxygen transmission rate after the retort processing was lower than 0.2 cm$^3$/m$^2$·day·atm. Thus, with respect to the both, the layered product exhibited excellent values.

Example 10

Polyacrylic acid (PAA) with a number average molecular weight of 150,000 and starch (soluble starch manufactured by Wako Pure Chemical Industries, Ltd.) were dissolved in distilled water in such a manner that the weight ratio therebetween was 97:3. Subsequently, ammonia water was added thereto to neutralize 1.5 mol % of the carboxyl groups of the polyacrylic acid. Thus, an aqueous polymer solution containing polyacrylic acid and starch was obtained, in which the solid content concentration was 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned aqueous polymer solution that was being stirred. Thus a solution (S10) was obtained. With respect to this solution (S10), the storage stability was evaluated by the method described above.

Next, a layered product (10) that had a structure of gas barrier layer (2 μm)/AC/OPET (12 μm) was produced by the same method as in Example 1 except that the solution (S10) was used instead of the solution (S1). The gas barrier layer was transparent and colorless and had a good surface appearance.

Next, the layered product (10) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-10) of the present invention was obtained. With respect to the layered product (B-10), the neutralization degree of the carboxyl groups of the polyacrylic acid contained in the gas barrier layer was determined by the aforementioned method. As a result, it was proved that 57 mol % of the carboxyl groups had been neutralized by calcium ions. In addition, with respect to the layered product (B-10), the oxygen barrier property, surface appearance, tensile strength and elongation, and content of inorganic components were evaluated by the aforementioned methods.

Furthermore, using the layered product (B-10), a layered product (B-10-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 92 mol %, while the oxygen transmission rate after the retort processing was lower than 0.2 cm$^3$/m$^2$·day·atm. Thus, with respect to the both, the layered product exhibited excellent values.

Example 11

First, the solution (S1) was prepared by the same method as in Example 1. Using this solution (S1), a gas barrier layer was formed on a base material (OPET) by the following method.

First, a two-component anchor coating agent (AC; Takelac 3210 (Trade Name) and Takenate A3072 (Trade Name), manufactured by Mitsui Takeda Chemicals, Inc.) was applied to one surface of a drawn PET film (OPET; Lumirror (Trade Name), manufactured by Toray Industries, Inc.), which then was dried. The solution (S1) was applied onto this anchor coat layer using a bar coater in such a manner as to form a layer with a thickness of 1 μm after being dried. This was dried at 80° C. for five minutes. Thereafter, the same two-component anchor coating agent as that described above was applied to the other surface of the drawn PET film, which then was dried. This anchor coat layer was coated with the solution (S1) using a bar coater in such a manner that the solution (S1) formed a layer with a thickness of 1 μm after being dried. This was dried at 80° C. for five minutes. Thereafter, this was heat-treated in dry air at 200° C. for five minutes. Thus, a layered product (11) that had a structure of gas barrier layer (1 μm)/AC/OPET (12 μm)/AC/gas barrier layer (1 μm) was obtained. The gas barrier layers were transparent and colorless and had a good surface appearance.

Next, the layered product (11) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-11) of the present invention was obtained. With respect to the layered product (B-11), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-11), the oxygen barrier property, surface appearance, tensile strength and elongation, and content of inorganic components were evaluated by the aforementioned methods.

Furthermore, using the layered product (B-11), a layered product (B-11-1) that had a structure of gas barrier layer/AC/OPET/AC/gas barrier layer/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree of the outermost layer after the retort processing was 90 mol %, while the oxygen transmission rate after the retort processing was lower than 0.2 cm$^3$/m$^2$·day·atm. Thus, with respect to the both, the layered product exhibited excellent values.

Example 12

First, the layered product (1) described in Example 1 was produced. Then this layered product (1) was subjected to the ionization treatment under the same conditions as those employed in Example 1 except that the period of time for immersing the layered product (1) in the calcium acetate aqueous solution was changed to approximately one second. Subsequently, superfluous calcium acetate was washed away with distilled water whose temperature had been adjusted to 80° C. Thereafter, it was dried at 80° C. for five minutes. Thus, a layered product (B-12) of the present invention was obtained. With respect to the layered product (B-12), the neutralization degree of the carboxyl groups of the polyacrylic acid contained in the gas barrier layer was determined by the aforementioned method. As a result, it was proved that 5 mol % of the carboxyl groups had been neutralized by calcium ions. In addition, with respect to the layered product (B-12) thus obtained, the oxygen barrier property, surface appearance, tensile strength and elongation, and content of inorganic components were evaluated by the aforementioned methods.

Furthermore, using the layered product (B-12), a layered product (B-12-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 5 mol %, while the oxygen transmission rate after the retort processing was 60 cm³/m²·day·atm. In this example, the retort processing was carried out using ion-exchanged water.

Example 13

First, the layered product (1) described in Example 1 was produced. Then this layered product (1) was subjected to the ionization treatment under the same conditions as those employed in Example 1 except that the period of time for immersing the layered product (1) in the calcium acetate aqueous solution (MI-1) was changed from 20 seconds to three seconds. Subsequently, superfluous calcium acetate was washed away with distilled water whose temperature had been adjusted to 80° C. Thereafter, it was dried at 80° C. for five minutes. Thus, a layered product (B-13) of the present invention was obtained. With respect to the layered product (B-13), the neutralization degree of the carboxyl groups of the polyacrylic acid contained in the gas barrier layer was determined by the aforementioned method. As a result, it was proved that 15 mol % of the carboxyl groups had been neutralized by calcium ions. In addition, with respect to the layered product (B-13) thus obtained, the oxygen barrier property, surface appearance, tensile strength and elongation, and content of inorganic components were evaluated by the aforementioned methods.

Furthermore, using the layered product (B-13), a layered product (B-13-1) that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 15 mol %. The oxygen transmission rate after the retort processing was good, specifically 12 cm³/m²·day·atm. In this example, the retort processing was carried out using ion-exchanged water.

Comparative Example 1

Using the layered product (4) produced in Example 4 that was not subjected to the ionization treatment, a layered product that had a structure of gas barrier layer/AC/OPET/adhesive/ONy/adhesive/PP was produced by the same method as in Example 1. With respect to this layered product, the dropped bag breaking strength, ionization degree after the retort processing, and oxygen transmission rate after the retort processing were measured. The ionization degree after the retort processing was 0%. The oxygen transmission rate after the retort processing was 87 cm³/m²·day·atm. The characteristics of this layered product were poor as compared to those of the layered products of Examples. In this comparative example, the retort processing was carried out using ion-exchanged water. Table 2 below also shows the results of the evaluations of the oxygen barrier property, surface appearance, tensile strength, and the content of inorganic components of the layered product (4).

Comparative Example 2

Polyacrylic acid (PAA) with a number average molecular weight of 150,000 was dissolved in distilled water, and thereby a polyacrylic acid aqueous solution was obtained, in which the solid content concentration was 10 wt %.

Next, a layered product (polyacrylic acid (2 μm)/AC/OPET (12 μm)) was produced by the same method as in Example 1 except that the above-mentioned 10-wt % polyacrylic acid aqueous solution was used instead of the solution (S1). The polyacrylic acid layer was transparent and colorless and had a good surface appearance.

Subsequently, calcium acetate was dissolved in distilled water in such a manner as to have a concentration of 10 wt %. This aqueous solution was kept warm at 80° C. Then, when the layered product was immersed in this aqueous solution (80° C.), a part of the polyacrylic acid layer was dissolved. Hence, further evaluations were not made.

Table 1 shows production conditions that were employed in the aforementioned examples and comparative examples. On the other hand, Table 2 shows the evaluation results and measurement results.

TABLE 1

| Examples | Carboxylic Acid-Containing Polymer | Added Polymer | | Content of Inorganic Components [wt %] | Univalent Ion | | Compound (B) Type | Compound (A) | | Polyvalent Ion | |
|---|---|---|---|---|---|---|---|---|---|---|---|
| | | Added Polymer | Added Amount [wt %] | | Ion Type | Added Amount [mol %] | | Type | Added Amount [mol % (*)] | Ion Type | Neutralization Degree |
| Example 1 | PAA | — | — | 30 | $NH_4^+$ | 1.5 | TMOS | a-1 | 10 | $Ca^{2+}$ | 60 |
| Example 2 | PAA | — | — | 30 | $NH_4^+$ | 1.5 | TMOS | a-1 | 10 | $Mg^{2+}$ | 64 |
| Example 3 | PAA | — | — | 30 | $NH_4^+$ | 1.5 | TMOS | a-1 | 10 | $Zn^{2+}$ | 60 |
| Example 4 | PAA | — | — | 30 | — | — | TMOS | a-1 | 10 | $Ca^{2+}$ | 63 |
| Example 5 | PAA | — | — | 30 | — | — | TMOS | a-1 | 20 | $Ca^{2+}$ | 55 |
| Example 6 | PAA | — | — | 8 | — | — | — | a-1 | 100 | $Ca^{2+}$ | 70 |
| Example 7 | PAA | — | — | 20 | — | — | TMOS | a-1 | 10 | $Ca^{2+}$ | 67 |
| Example 8 | PAA | — | — | 30 | — | — | TMOS | a-2 | 10 | $Ca^{2+}$ | 62 |
| Example 9 | PAA | PVA | 3 | 30 | $NH_4^+$ | 1.5 | TMOS | a-1 | 10 | $Ca^{2+}$ | 58 |
| Example 10 | PAA | Starch | 3 | 30 | $NH_4^+$ | 1.5 | TMOS | a-1 | 10 | $Ca^{2+}$ | 57 |
| Example 11 | PAA | — | — | 30 | $NH_{4+}$ | 1.5 | TMOS | a-1 | 10 | $Ca^{2+}$ | 61 |
| Example 12 | PAA | — | — | 30 | — | — | TMOS | a-1 | 10 | $Ca^{2+}$ | 5 |
| Example 13 | PAA | — | — | 30 | — | — | TMOS | a-1 | 10 | $Ca^{2+}$ | 15 |
| Comparative Example 1 | PAA | — | — | 30 | — | — | TMOS | a-1 | 10 | — | — |
| Comparative Example 2 | PAA | — | — | 0 | — | — | — | — | — | $Ca^{2+}$ | — | a-1: gamma-glycidoxypropyltrimethoxysilane
a-2: gamma-aminopropyltrimethoxysilane
(*) The ratio of Compound (A) to the total of Compound (A) and Compound (B) [(Compound (A))/(Compound (A) + Compound (B))]

TABLE 2

| Examples | Rate of Increase in Viscosity of Solution (S) (%) | Oxygen Transmission Rate (cm³/m²·day·atm) | | | Oxygen Transmission Rate after Retort Processing (cm³/m²·day·atm) | Surface Appearance | Dropped Bag Breaking Strength (Times) | Tensile Strength and Elongation | |
|---|---|---|---|---|---|---|---|---|---|
| | | 65% RH | 85% RH | 95% RH | | | | Strength (MPa) | Elongation (%) |
| Example 1 | 2 | 0.4 | 0.4 | 0.5 | 0.2> | AA | 115 | 140 | 220 |
| Example 2 | 2 | 0.4 | 0.4 | 0.5 | 0.2> | AA | 117 | 140 | 200 |
| Example 3 | 2 | 0.4 | 0.4 | 0.5 | 0.2> | AA | 110 | 130 | 220 |
| Example 4 | 0 | 0.2 | 0.2 | 0.2 | 0.2> | A | 101 | 140 | 220 |
| Example 5 | 0 | 0.5 | 0.5 | 0.6 | 0.2> | AA | 94 | 120 | 180 |
| Example 6 | 0 | 0.2 | 0.2 | 0.2 | 0.2> | AA | 82 | 100 | 160 |
| Example 7 | 0 | 0.4 | 0.4 | 0.5 | 0.2> | AA | 96 | 120 | 170 |
| Example 8 | 1 | 0.8 | 0.8 | 1.0 | 0.2> | A | 98 | 140 | 200 |
| Example 9 | 1 | 0.2 | 0.2 | 0.2 | 0.2> | AA | 134 | 160 | 240 |
| Example 10 | 1 | 0.2 | 0.2 | 0.2 | 0.2> | A | 137 | 160 | 230 |
| Example 11 | 2 | 0.7 | 0.7 | 0.8 | 0.2> | A | 98 | 130 | 190 |
| Example 12 | 2 | 35 | 45 | 68 | 60 | A | 121 | 140 | 200 |
| Example 13 | 2 | 11 | 13 | 25 | 12 | A | 110 | 160 | 210 |
| Comparative Example 1 | 1 | 38 | 52 | 83 | 87 | A | 112 | 140 | 200 |
| Comparative Example 2 | — | — | — | — | — | — | — | — | — |

As shown in Table 2, the layered products (B-1) to (B-13) of Examples 1 to 13 each exhibited a higher oxygen barrier property than that of the layered product (4) of Comparative Example 1 that was not subjected to the ionization treatment, under all the humidity conditions. Among them, the layered products (B-1) to (B-11) and the layered product (B-13) of Examples 1 to 11 and 13, particularly, the layered products (B-1) to (B-11) of Examples 1 to 11 each exhibited a higher oxygen barrier property under all the conditions without depending on humidity. These layered products also were transparent and had a good surface appearance. Furthermore, as compared to the film of the OPET single layer with no gas barrier layer formed thereon, these layered products were not inferior in tensile strength and elongation and exhibited good characteristics.

As shown in Table 2, the layered products (B-1-1) to (B-13-1) of Examples 1 to 13 each had a higher oxygen barrier property even after the retort processing as compared to the layered product of Comparative Example 1. Particularly, the layered products of Examples 1 to 11 and 13 (especially Examples 1 to 11) each had a very high oxygen barrier property after the retort processing.

Furthermore, the layered products (B-1-1) to (B-13-1) having a multilayered structure that were produced in Examples 1 to 13 each had high dropped bag breaking strength and high bending resistance.

Moreover, as shown in Table 2, the change in viscosity hardly was found in the respective solutions (S1) to (S10) even after a lapse of two days.

Example 14

First, the solution (S1) was prepared by the same method as in Example 1. Using this solution (S1), a gas barrier layer was formed on a base material (OPET) by the following method.

In a two-component anchor coating agent used herein, Takelac A3210 (Trade Name) manufactured by Mitsui Takeda Chemicals, Inc. was used as a polyol base resin, and Takenate A3072 (Trade Name) manufactured by Mitsui Takeda Chemicals, Inc. was used as an aromatic isocyanate curing agent. These base resin and curing agent as well as ethyl acetate (the moisture contained in ethyl acetate was 340 ppm) were mixed together in such a manner that the weight ratio of the base resin/the curing agent was 1/1. Thereafter, a drawn PET film (OPET; Lumirror (Trade Name), manufactured by Toray Industries, Inc.) was coated with the mixture, which then was dried. Thus a base material (AC/OPET) having an anchor coat layer (an adhesive layer) with a thickness of 0.1 μm was produced. The anchor coat layer of this base material was coated with the solution (S1) using a bar coater in such a manner that the solution (S1) formed a layer with a thickness of 1 μm after being dried. This was dried at 80° C. for five minutes. Thereafter, the same two-component anchor coating agent as that described above was applied to the other surface of the drawn PET film to have the same thickness as that described above, which then was dried. This anchor coat layer was coated with the solution (S1) using a bar coater in such a manner that the solution (S1) formed a layer with a thickness of 1 μm after being dried. This was dried at 80° C. for five minutes. After that, this was heat-treated in dry air at 200° C. for five minutes. Thus a layered product (14) that had a structure of gas barrier layer (1 μm)/AC (0.1 μm)/OPET (12 μm)/AC (0.1 μm)/gas barrier layer (1 μm) was obtained. The gas barrier layers were transparent and colorless and had a good surface appearance.

Next, the layered product (14) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-14) of the present invention was obtained. With respect to the layered product (B-14), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-14), the oxygen barrier property, surface appearance, change in appearance caused through heating, tensile strength and elongation, haze, and content of inorganic components were evaluated by the aforementioned methods.

Furthermore, using the layered product (B-14), a layered product (B-14-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 93 mol %, while the oxygen transmission rate after the retort processing was lower than 0.2 $cm^3/m^2 \cdot day \cdot atm$. Thus, with respect to the both, the layered product exhibited excellent values.

Example 15

A layered product (15) that had a structure of gas barrier layer (1 μm)/AC (0.2 μm)/OPET (12 μm)/AC (0.2 μm)/gas barrier layer (1 μm) was obtained by the same method as in Example 14 except that the thickness of the anchor coat layer was changed to 0.2 μm. The gas barrier layers were transparent and colorless and had a good surface appearance.

Next, the layered product (15) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-15) of the present invention was obtained. With respect to the layered product (B-15), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-15), the oxygen barrier property, surface appearance, change in appearance through heating, tensile strength and elongation, haze, and content of inorganic components were evaluated by the aforementioned methods.

Furthermore, using the layered product (B-15), a layered product (B-15-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 90 mol %, while the oxygen transmission rate after the retort processing was lower than 0.2 $cm^3/m^2 \cdot day \cdot atm$. Thus, with respect to the both, the layered product exhibited excellent values.

Example 16

A layered product (16) that had a structure of gas barrier layer (1 μm)/AC (0.1 μm)/OPET (12 μm)/AC (0.1 μm)/gas barrier layer (1 μm) was obtained by the same method as in Example 14 except that with respect to the base resin and the curing agent of the two-component anchor coating agent and ethyl acetate (the moisture contained in ethyl acetate was 320 ppm), the weight ratio between the base resin and the curing agent was changed to 3/1 (the base resin/the curing agent). The gas barrier layers were transparent and colorless and had a good surface appearance.

Next, the layered product (16) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-16) of the present invention was obtained. With respect to the layered product (B-16), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-16), the oxygen barrier property, surface appearance, change in appearance through heating, tensile strength and elongation, haze, and content of inorganic components were evaluated by the aforementioned methods.

Furthermore, using the layered product (B-16), a layered product (B-16-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 90 mol %, while the oxygen transmission rate after the retort processing was lower than 0.2 $cm^3/m^2 \cdot day \cdot atm$. Thus, with respect to the both, the layered product exhibited excellent values.

Example 17

A layered product (17) that had a structure of gas barrier layer (1 μm)/AC (0.1 μm)/OPET (12 μm)/AC (0.1 μm)/gas barrier layer (1 μm) was obtained by the same method as in Example 14 except that the base resin and the curing agent of the two-component anchor coating agent and ethyl acetate (the moisture contained in ethyl acetate was 5000 ppm) were mixed together in such a manner that the weight ratio between the base resin and the curing agent was 1/1 (the base resin/the curing agent). The gas barrier layers were transparent and colorless and had a good surface appearance.

Next, the layered product (17) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-17) of the present invention was obtained. With respect to the layered product (B-17), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-17), the oxygen barrier property, peel strength, surface appearance, change in appearance through heating, tensile strength and elongation, haze, and content of inorganic components were evaluated by the aforementioned methods.

Furthermore, using the layered product (B-17), a layered product (B-17-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 90 mol %, while the oxygen transmission rate after the retort processing was lower than 0.2 cm³/m²·day·atm. Thus, with respect to the both, the layered product exhibited excellent values.

Example 18

A layered product (18) that had a structure of gas barrier layer (1 μm)/AC (0.1 μm)/OPET (12 μm)/AC (0.1 μm)/gas barrier layer (1 μm) was obtained by the same method as in Example 14 except that the anchor coating agent used in this example was different from that used in Example 14. The gas barrier layers were transparent and colorless and had a good surface appearance. The anchor coating agent employed in Example 18 was a two-component anchor coating agent in which a polyol base resin and an aliphatic isocyanate curing agent that was less susceptible to the effect of moisture contained in an organic solvent were used. Takelac A626 (Trade Name) manufactured by Mitsui Takeda Chemicals, Inc. was used as the base resin, while Takenate A50 (Trade Name) manufactured by Mitsui Takeda Chemicals, Inc. was used as the curing agent. The base resin, the curing agent, and ethyl acetate (the moisture contained in ethyl acetate was 1200 ppm) were mixed together in such a manner that the weight ratio between the base resin and the curing agent was 4/3 (the base resin/the curing agent).

Next, the layered product (18) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-18) of the present invention was obtained. With respect to the layered product (B-18), the neutralization degree of the carboxyl groups of the polyacrylic acid contained in the gas barrier layers was determined by the aforementioned method. As a result, it was proved that 61 mol % of the carboxyl groups had been neutralized by calcium ions. In addition, with respect to the layered product (B-18), the oxygen barrier property, surface appearance, change in appearance through heating, tensile strength and elongation, haze, and content of inorganic components were evaluated by the aforementioned methods.

Furthermore, using the layered product (B-18), a layered product (B-18-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 90 mol %, while the oxygen transmission rate after the retort processing was lower than 0.2 cm³/m²·day·atm. Thus, with respect to the both, the layered product exhibited excellent values.

Example 19

First, the solution (S1) was prepared by the same method as in Example 1.

The anchor coating agent employed in this example was a two-component anchor coating agent in which a polyol base resin and an aliphatic isocyanate curing agent that was less susceptible to the effect of moisture contained in an organic solvent were used. Takelac A626 (Trade Name) manufactured by Mitsui Takeda Chemicals, Inc. was used as the base resin, while Takenate A50 (Trade Name) manufactured by Mitsui Takeda Chemicals, Inc. was used as the curing agent. The base resin, the curing agent, and ethyl acetate (the moisture contained in ethyl acetate was 560 ppm) were mixed together in such a manner that the weight ratio between the base resin and the curing agent was 4/3 (the base resin/the curing agent). Thereafter, a drawn PET film (OPET; Lumirror (Trade Name), manufactured by Toray Industries, Inc.) was coated with the mixture, which then was dried. Thus a base material (AC/OPET) having an anchor coat layer (an adhesive layer) with a thickness of 0.1 μm was produced.

Next, an aluminum oxide layer (with a thickness of 30 nm) was vapor-deposited on the anchor coat layer in a vacuum vapor deposition apparatus that employed an electron beam heating system. Subsequently, the aluminum oxide layer was coated with the solution (S1) using a bar coater in such a manner that the solution (S1) formed a layer with a thickness of 1 μm after being dried. This was dried at 80° C. for five minutes. After that, this was heat-treated in dry air at 200° C. for five minutes. Thus a layered product (19) that had a structure of gas barrier layer (1 μm)/aluminum oxide layer/AC/OPET (12 μm) was obtained. The gas barrier layer was transparent and colorless and had a good surface appearance.

Next, the layered product (19) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-19) of the present invention was obtained. With respect to the layered product (B-19), the neutralization degree of the carboxyl groups of the polyacrylic acid contained in the gas barrier layer was determined by the aforementioned method. As a result, it was proved that 61 mol % of the carboxyl groups had been neutralized by calcium ions. In addition, with respect to the layered product (B-19), the oxygen barrier property, surface appearance, change in appearance through heating, tensile strength and elongation, haze, and content of inorganic components were evaluated by the aforementioned methods.

Furthermore, using the layered product (B-19), a layered product (B-19-1) that had a structure of OPET/AC/vapor-deposited thin film layer/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 90 mol %, while the oxygen transmission rate after the retort processing was lower than 0.2 cm³/m²·day·atm. Thus, with respect to the both, the layered product exhibited excellent values.

Example 20

First, the solution (S1) was prepared by the same method as in Example 1.

The anchor coating agent employed in this example was a two-component anchor coating agent in which a polyol base resin and an aliphatic isocyanate curing agent were used. Takelac A626 (Trade Name) manufactured by Mitsui Takeda Chemicals, Inc. was used as the base resin, while Takenate A50 (Trade Name) manufactured by Mitsui Takeda Chemicals, Inc. was used as the curing agent. The base resin, the curing agent, and ethyl acetate (the moisture contained in ethyl acetate was 620 ppm) were mixed together in such a manner that the weight ratio between the base resin and the curing agent was 4/3 (the base resin/the curing agent). Thereafter, a drawn PET film (OPET; Lumirror (Trade Name), manufactured by Toray Industries, Inc.) was coated with the mixture, which then was dried. Thus a base material (AC/OPET) having an anchor coat layer (an adhesive layer) with a thickness of 0.1 μm was produced.

Next, a silicon oxide layer (with a thickness of 25 nm) was vapor-deposited on the anchor coat layer in a vacuum vapor deposition apparatus that employed an electron beam heating system. Subsequently, the silicon oxide layer was coated with the solution (S1) using a bar coater in such a manner that the solution (S1) formed a layer with a thickness of 1 μm after being dried. This was dried at 80° C. for five minutes. After that, this was heat-treated in dry air at 200° C. for five minutes. Thus a layered product (20) that had a structure of gas barrier layer (1 μm)/silicon oxide layer/AC/OPET (12 μm) was obtained. The gas barrier layer was transparent and colorless and had a good surface appearance.

Next, the layered product (20) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-20) of the present invention was obtained. With respect to the layered product (B-20), the neutralization degree of the carboxyl groups of the polyacrylic acid contained in the gas barrier layer was determined by the aforementioned method. As a result, it was proved that 60 mol % of the carboxyl groups had been neutralized by calcium ions. In addition, with respect to the layered product (B-20), the oxygen barrier property, surface appearance, change in appearance through heating, tensile strength and elongation, haze, and content of inorganic components were evaluated by the aforementioned methods.

Furthermore, using the layered product (B-20), a layered product (B-) that had a structure of OPET/AC/vapor-deposited thin film layer/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 88 mol %, while the oxygen transmission rate after the retort processing was lower than 0.2 cm$^3$/m$^2$·day·atm. Thus, with respect to the both, the layered product exhibited excellent values.

Example 21

A layered product (21) that had a structure of gas barrier layer (1 μm)/AC (0.1 μm)/OPET (12 μm)/AC (0.1 μm)/gas barrier layer (1 μm) was obtained by the same method as in Example 14 except that the heat treatment to be carried out at 200° C. for five minutes was not performed. The gas barrier layers were transparent and colorless and had a good surface appearance.

Next, the layered product (21) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-21) of the present invention was obtained. With respect to the layered product (B-21), the neutralization degree of the carboxyl groups of the polyacrylic acid contained in the gas barrier layers was determined by the aforementioned method. As a result, it was proved that 94 mol % of the carboxyl groups had been neutralized by calcium ions. In addition, with respect to the layered product (B-21), the oxygen barrier property, surface appearance, change in appearance through heating, tensile strength and elongation, haze, and content of inorganic components were evaluated by the aforementioned methods.

Furthermore, using the layered product (B-21), a layered product (B-21-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 96 mol %, while the oxygen transmission rate after the retort processing was lower than 0.3 cm$^3$/m$^2$·day·atm. With respect to the both, the layered product exhibited excellent values. In addition, the oxygen transmission rate after the retort processing that was carried out using ion-exchanged water was 0.3 cm$^3$/m$^2$·day·atm.

Example 22

A layered product (22) that had a structure of gas barrier layer (1 μm)/AC (0.1 μm)/OPET (12 μm)/AC (0.1 μm)/gas barrier layer (1 μm) was obtained by the same method as in Example 14. The gas barrier layers were transparent and colorless and had a good surface appearance.

Next, the layered product (22) was subjected to the ionization treatment under the same conditions as those employed in Example 1 except that the period of time for which the ionization treatment was carried out was 300 seconds. Subsequently, superfluous calcium acetate was washed away with distilled water whose temperature had been adjusted to 80° C. Thereafter, it was dried at 80° C. for five minutes. Thus, a layered product (B-22) of the present invention was obtained. With respect to the layered product (B-22), the neutralization degree of the carboxyl groups of the polyacrylic acid contained in the gas barrier layers was determined by the aforementioned method. As a result, it was proved that 97 mol % of the carboxyl groups had been neutralized by calcium ions. In addition, with respect to the layered product (B-22), the oxygen barrier property, surface appearance, change in appearance through heating, tensile strength and elongation, haze, and content of inorganic components were evaluated by the aforementioned methods.

Furthermore, using the layered product (B-22), a layered product (B-22-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 93 mol %, while the oxygen transmission rate after the retort processing was lower than 0.2 cm$^3$/m$^2$·day·atm. Thus, with respect to the both, the layered product exhibited excellent values. In this example, the retort processing was carried out using ion-exchanged water.

Comparative Example 3

A layered product that had a structure of gas barrier layer (1 μm)/AC (0.1 μm)/OPET (12 μm)/AC (0.1 μm)/gas barrier layer (1 μm) was obtained by the same method as in Example 14. The gas barrier layers were transparent and colorless and had a good surface appearance.

The layered product thus obtained was subjected to a neutralization treatment using a sodium acetate aqueous solution as described below. First, sodium acetate was dissolved in distilled water in such a manner as to have a concentration of 10 wt %. This aqueous solution was kept warm at 80° C. Then, the above-mentioned layered product was immersed in this aqueous solution for approximately 20 seconds. Thereafter, this layered product was removed therefrom. Then the surfaces of the layered product were washed with distilled water whose temperature had been adjusted to 80° C. After that, it was dried at 80° C. for five minutes. Thus, a layered product (C3) was obtained. With respect to the layered product (C3), the neutralization degree of the carboxyl groups of the polyacrylic acid contained in the gas barrier layers was determined by the aforementioned method. As a result, it was proved that 63 mol % of the carboxyl groups had been neutralized by sodium ions. With respect to the layered product (C3) thus obtained, the oxygen barrier property, surface appearance, tensile strength and elongation, and the content of inorganic components were evaluated by the aforementioned methods.

Furthermore, using the layered product (C3), a layered product (C-3-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 63 mol %, while the oxygen transmission rate after the retort processing was 84 cm$^3$/m$^2$·day·atm. In this comparative example, the retort processing was carried out using ion-exchanged water.

Table 3 indicates the production conditions of Examples 14 to 21 and Comparative Example 3. In addition, Table 4 indicates the evaluations results and measurement results. The content of nitrogen in the anchor coating agent was determined from ultimate analysis.

TABLE 3

| Examples | Carboxylic Acid-Containing Polymer | AC Layer Content of Nitrogen (wt %) | AC Layer Thickness [μm] | AC Layer Structure | Content of Inorganic Components [wt %] | Univalent Ion Type | Univalent Ion Added Amount [mol %] | Compound (B) Type | Compound (A) Type | Compound (A) Added Amount [mol % (*)] | Polyvalent Ion Type | Neutralization Degree |
|---|---|---|---|---|---|---|---|---|---|---|---|---|
| Example 14 | PAA | 7.9 | 0.1 | Both Sides | 30 | NH$_4^+$ | 1.5 | TMOS | a-1 | 10 | Ca$^{2+}$ | 61 |
| Example 15 | PAA | 7.9 | 0.2 | Both Sides | 30 | NH$_4^+$ | 1.5 | TMOS | a-1 | 10 | Ca$^{2+}$ | 61 |
| Example 16 | PAA | 4.4 | 0.1 | Both Sides | 30 | NH$_4^+$ | 1.5 | TMOS | a-1 | 10 | Ca$^{2+}$ | 61 |
| Example 17 | PAA | 7.2 | 0.1 | Both Sides | 30 | NH$_4^+$ | 1.5 | TMOS | a-1 | 10 | Ca$^{2+}$ | 61 |
| Example 18 | PAA | 4.9 | 0.1 | Both Sides | 30 | NH$_4^+$ | 1.5 | TMOS | a-1 | 10 | Ca$^{2+}$ | 61 |
| Example 19 | PAA | 4.9 | 0.1 | One Side | 30 | NH$_4^+$ | 1.5 | TMOS | a-1 | 10 | Ca$^{2+}$ | 61 |
| Example 20 | PAA | 4.9 | 0.1 | One Side | 30 | NH$_4^+$ | 1.5 | TMOS | a-1 | 10 | Ca$^{2+}$ | 60 |
| Example 21 | PAA | 7.2 | 0.1 | Both Sides | 30 | NH$_4^+$ | 1.5 | TMOS | a-1 | 10 | Ca$^{2+}$ | 94 |
| Example 22 | PAA | 7.2 | 0.1 | Both Sides | 30 | NH$_4^+$ | 1.5 | TMOS | a-1 | 10 | Ca$^{2+}$ | 97 |
| Comparative Example 3 | PAA | 7.2 | 0.1 | Both Sides | 30 | NH$_4^+$ | 1.5 | TMOS | a-1 | 10 | (Na$^+$) | (63) | a-1: gamma-glycidoxypropyltrimethoxysilane
(*) The ratio of Compound (A) to the total of Compound (A) and Compound (B)
[(Compound (A))/(Compound (A) + Compound (B))]

TABLE 4

| Examples | Rate of Increase in Viscosity of Solution (S) (%) | Oxygen Transmission Rate (cm$^3$/m$^2$·day·atm) 65% RH | Oxygen Transmission Rate (cm$^3$/m$^2$·day·atm) 85% RH | Oxygen Transmission Rate (cm$^3$/m$^2$·day·atm) 95% RH | Oxygen Transmission Rate after Retort Processing (cm$^3$/m$^2$·day·atm) | 3σ of Haze | Surface Appearance | Surface Appearance After Heating | Peel Strength [g/15 mm] | Dropped Bag Breaking Strength (Times) | Tensile Strength (MPa) | Elongation (%) |
|---|---|---|---|---|---|---|---|---|---|---|---|---|
| Example 14 | 2 | 0.4 | 0.4 | 0.5 | 0.2> | 0.63 | AA | AA | 570 | 120 | 140 | 210 |
| Example 15 | 2 | 0.4 | 0.4 | 0.5 | 0.2> | 0.60 | AA | B | 630 | 130 | 130 | 180 |
| Example 16 | 2 | 0.4 | 0.4 | 0.5 | 0.2> | 0.60 | AA | A | 550 | 110 | 130 | 220 |

TABLE 4-continued

| Examples | Rate of Increase in Viscosity of Solution (S) (%) | Oxygen Transmission Rate (cm³/m²·day·atm) | | | Oxygen Transmission Rate after Retort Processing (cm³/m²·day·atm) | 3σ of Haze | Surface Appearance Surface Appearance | Surface Appearance After Heating | Peel Strength [g/15 mm] | Dropped Bag Breaking Strength (Times) | Tensile Strength and Elongation | |
|---|---|---|---|---|---|---|---|---|---|---|---|---|
| | | 65% RH | 85% RH | 95% RH | | | | | | | Strength (MPa) | Elongation (%) |
| Example 17 | 2 | 0.4 | 0.4 | 0.5 | 0.2> | 2.40 | A | A | 250 | 78 | 140 | 220 |
| Example 18 | 2 | 0.4 | 0.4 | 0.5 | 0.2> | 0.30 | AA | AA | 560 | 125 | 120 | 190 |
| Example 19 | 2 | 0.2> | 0.2> | 0.2> | 0.2> | 0.30 | AA | AA | 380 | 73 | 120 | 200 |
| Example 20 | 2 | 0.2> | 0.2> | 0.2> | 0.2> | 0.30 | AA | AA | 360 | 81 | 110 | 200 |
| Example 21 | 2 | 0.2> | 0.2> | 0.2> | 0.2> | 0.60 | AA | B | 570 | 52 | 120 | 220 |
| Example 22 | 2 | 0.2> | 0.2> | 0.2> | 0.2> | 0.62 | AA | AA | 600 | 118 | 140 | 200 |
| Comparative Example 3 | 2 | 84 | 87 | 89 | 87 | 0.59 | AA | AA | 590 | 110 | 140 | 190 |

Example 23

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 68.4 parts by weight of tetramethoxysilane (TMOS) was dissolved in 79.8 parts by weight of methanol. Subsequently, 11.4 parts by weight of 3-chloropropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 657 parts by weight of the above-mentioned 10-wt % polyacrylic acid aqueous solution that was being stirred. Thus a solution (S23) was obtained.

On the other hand, a drawn PET film (OPET) was coated with a two-component anchor coating agent (Takelac 3210 (Trade Name) and Takenate A3072 (Trade Name), manufactured by Mitsui Takeda Chemicals, Inc.), which then was dried. Thus a base material (AC/OPET) having an anchor coat layer was produced. The anchor coat layer of the base material was coated with the solution (S23) using a bar coater in such a manner that the solution (S23) formed a layer with a thickness of 2 μm after being dried. This was dried at 80° C. for five minutes and then was heat-treated in dry air at 200° C. for five minutes. Thus, a layered product (23) that had a structure of gas barrier layer (2 μm)/AC/OPET (12 μm) was obtained. The gas barrier layer was transparent and colorless and had an excellent appearance.

Next, calcium acetate was dissolved in distilled water in such a manner as to have a concentration of 10 wt %. This aqueous solution was kept warm at 80° C. Then, the layered product (23) was immersed in this aqueous solution (80° C.; MI-1) for approximately five seconds. Thereafter, this layered product was removed therefrom. Then the surfaces of the layered product were washed with distilled water whose temperature had been adjusted to 80° C. After that, it was dried at 80° C. for five seconds. Thus, a layered product (B-23) of the present invention was obtained. With respect to the layered product (B-23), the neutralization degree of the carboxyl groups of the polyacrylic acid contained in the gas barrier layer was determined by the aforementioned method. As a result, it was proved that 69 mol % of the carboxyl groups had been neutralized by calcium ions. With respect to the layered product (B-23) thus obtained, the oxygen barrier property, haze, and the content of inorganic components were evaluated by the aforementioned methods.

Furthermore, an drawn nylon film (Emblem (Trade Name), manufactured by Unitika, Ltd.; with a thickness of 15 μm; hereinafter may be abbreviated as "ONy" in some cases) and a polypropylene film (RXC-18 (Trade Name), manufactured by Tohcello Co., Ltd.; with a thickness of 50 μm; hereinafter may be abbreviated as "PP" in some cases) each were coated with a two-component adhesive (A-385 (Trade Name) and A-50 (Trade Name), manufactured by Mitsui Takeda Chemicals, Inc.), which then were dried. Then the films thus obtained were laminated with the above-mentioned layered product (B-23; gas barrier layer/AC/OPET). Thus, a layered product (B-23-1) that had a structure of gas barrier layer/AC/OPET/adhesive/ONy/adhesive/PP was obtained. Using this layered product, the neutralization degree after the retort processing and the oxygen transmission rate after the retort processing were measured. The neutralization degree after the retort processing was 92 mol %, while the oxygen transmission rate after the retort processing was lower than 0.2 cm³/m²·day·atm. Thus, with respect to the both, the layered product exhibited excellent values.

Example 24

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 68.4 parts by weight of tetramethoxysilane was dissolved in 79.7 parts by weight of methanol. Subsequently, 11.3 parts by weight of 3-mercaptopropyltrimethoxysilane (manufactured by Chisso Corporation) was dissolved therein.

Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that were being stirred. Thus a solution (S24) was obtained. With respect to this solution (S24), the storage stability was evaluated by the method described above.

Next, a layered product (24) that had a structure of gas barrier layer (2 μm)/AC/OPET (12 μm) was produced by the same method as in Example 23 except that the solution (S24) was used instead of the solution (S23). The gas barrier layer of the layered product (24) was transparent and colorless and had an excellent surface appearance.

Next, the layered product (24) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-24) of the present invention was obtained. With respect to the layered product (B-24), the neutralization degree of the carboxyl groups of the polyacrylic acid contained in the gas barrier layer was determined by the aforementioned method. As a result, it was proved that 86 mol % of the carboxyl groups had been neutralized by calcium ions. In addition, with respect to the layered product (B-24), the oxygen barrier property, haze, and content of inorganic components were evaluated by the aforementioned methods.

Furthermore, using the layered product (B-24), a layered product (B-24-1) that had a structure of gas barrier layer/AC/OPET/adhesive/ONy/adhesive/PP was produced by the same method as in Example 23. With respect to this layered product, the neutralization degree after the retort processing and the oxygen transmission rate after the retort processing were measured. The neutralization degree after the retort processing was 95 mol %, while the oxygen transmission rate after the retort processing was lower than 0.2 cm$^3$/m$^2$·day·atm. Thus, with respect to the both, the layered product exhibited excellent values.

Example 25

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 68.4 parts by weight of tetramethoxysilane was dissolved in 68.4 parts by weight of methanol. Subsequently, 23.0 parts by weight of a 50% ethanol solution of N-(3-triethoxysilylpropyl)gluconamide (sold by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 541 parts by weight of the above-mentioned 10-wt % polyacrylic acid aqueous solution that were being stirred. Thus a solution (S25) was obtained. With respect to this solution (S25), the storage stability was evaluated by the method described above.

Next, a layered product (25) that had a structure of gas barrier layer (2 μm)/AC/OPET (12 μm) was produced by the same method as in Example 23 except that the solution (S25) was used instead of the solution (S23). The gas barrier layer of the layered product (25) was transparent and colorless and had an excellent surface appearance.

Next, the layered product (25) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-25) of the present invention was obtained. With respect to the layered product (B-25), the neutralization degree of the carboxyl groups of the polyacrylic acid contained in the gas barrier layer was determined by the aforementioned method. As a result, it was proved that 50 mol % of the carboxyl groups had been neutralized by calcium ions. In addition, with respect to the layered product (B-25), the oxygen barrier property, haze, and content of inorganic components were evaluated by the aforementioned methods.

Furthermore, using the layered product (B-25), a layered product (B-25-1) that had a structure of gas barrier layer/AC/OPET/adhesive/ONy/adhesive/PP was produced by the same method as in Example 23. With respect to this layered product, the neutralization degree after the retort processing and the oxygen transmission rate after the retort processing were measured. The neutralization degree after the retort processing was 89 mol %, while the oxygen transmission rate after the retort processing was lower than 0.2 cm$^3$/m$^2$·day·atm. Thus, with respect to the both, the layered product exhibited excellent values.

Example 26

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 60.8 parts by weight of tetramethoxysilane was dissolved in 83.6 parts by weight of methanol. Subsequently, 22.9 parts by weight of 3-chloropropyltrimethoxysilane was dissolved therein. Thereafter, 5.20 parts by weight of distilled water and 12.9 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 247 parts by weight of distilled water, which then was added promptly to 567 parts by weight of the above-mentioned 10-wt % polyacrylic acid aqueous solution that were being stirred. Thus a solution (S26) was obtained. With respect to this solution (S26), the storage stability was evaluated by the method described above.

Next, a layered product (26) that had a structure of gas barrier layer (2 μm)/AC/OPET (12 μm) was produced by the same method as in Example 23 except that the solution (S26) was used instead of the solution (S23). The gas barrier layer of the layered product (26) was transparent and colorless and had an excellent surface appearance.

Next, the layered product (26) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-26) of the present invention was obtained. With respect to the layered product (B-26), the neutralization degree of the carboxyl groups of the polyacrylic acid contained in the gas barrier layer was determined by the aforementioned method. As a result, it was proved that 55 mol % of the carboxyl groups had been neutralized by calcium ions. In addition, with respect to the layered product (B-26), the oxygen barrier property, haze, and content of inorganic components were evaluated by the aforementioned methods.

Furthermore, using the layered product (B-26), a layered product (B-26-1) that had a structure of gas barrier layer/AC/OPET/adhesive/ONy/adhesive/PP was produced by the same method as in Example 23. With respect to this layered product, the neutralization degree after the retort processing and the oxygen transmission rate after the retort processing were measured. The neutralization degree after the retort processing was 74 mol %, while the oxygen transmission rate after the retort processing was lower than 0.2 $cm^3/m^2 \cdot day \cdot atm$. Thus, with respect to the both, the layered product exhibited excellent values.

Example 27

Polyacrylic acid (PAA) with a number average molecular weight of 150,000 was dissolved in distilled water. Thus, a polyacrylic acid aqueous solution was obtained, in which the solid content concentration was 10 wt %.

Next, 68.4 parts by weight of tetramethoxysilane was dissolved in 79.8 parts by weight of methanol. Subsequently, 11.4 parts by weight of 3-chloropropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 657 parts by weight of the above-mentioned 10-wt % polyacrylic acid aqueous solution that were being stirred. Thus a solution (S27) was obtained. With respect to this solution (S27), the storage stability was evaluated by the method described above.

Next, a layered product (27) that had a structure of gas barrier layer (2 μm)/AC/OPET (12 μm) was produced by the same method as in Example 23 except that the solution (S27) was used instead of the solution (S23). The gas barrier layer of the layered product (27) was transparent and colorless and had an excellent surface appearance.

Next, the layered product (27) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-27) of the present invention was obtained. With respect to the layered product (B-27), the neutralization degree of the carboxyl groups of the polyacrylic acid contained in the gas barrier layer was determined by the aforementioned method. As a result, it was proved that 69 mol % of the carboxyl groups had been neutralized by calcium ions. In addition, with respect to the layered product (B-27), the oxygen barrier property, haze, and content of inorganic components were evaluated by the aforementioned methods.

Furthermore, using the layered product (B-27), a layered product (B-27-1) that had a structure of gas barrier layer/AC/OPET/adhesive/ONy/adhesive/PP was produced by the same method as in Example 23. With respect to this layered product, the neutralization degree after the retort processing and the oxygen transmission rate after the retort processing were measured. The neutralization degree after the retort processing was 91 mol %, while the oxygen transmission rate after the retort processing was lower than 0.2 $cm^3/m^2 \cdot day \cdot atm$. Thus, with respect to the both, the layered product exhibited excellent values.

Example 28

Polyacrylic acid (PAA) with a number average molecular weight of 150,000 was dissolved in distilled water. Thus, a polyacrylic acid aqueous solution was obtained, in which the solid content concentration was 10 wt %.

Next, 68.4 parts by weight of tetramethoxysilane was dissolved in 79.7 parts by weight of methanol. Subsequently, 11.3 parts by weight of 3-mercaptopropyltrimethoxysilane was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that were being stirred. Thus a solution (S28) was obtained. With respect to this solution (S28), the storage stability was evaluated by the method described above.

Next, a layered product (28) that had a structure of gas barrier layer (2 μm)/AC/OPET (12 μm) was produced by the same method as in Example 23 except that the solution (S28) was used instead of the solution (S23). The gas barrier layer of the layered product (28) was transparent and colorless and had an excellent surface appearance.

Next, the layered product (28) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-6) of the present invention was obtained. With respect to the layered product (B-28), the neutralization degree of the carboxyl groups of the polyacrylic acid contained in the gas barrier layer was determined by the aforementioned method. As a result, it was proved that 85 mol % of the carboxyl groups had been neutralized by calcium ions. In addition, with respect to the layered product (B-28), the oxygen barrier property, haze, and content of inorganic components were evaluated by the aforementioned methods.

Furthermore, using the layered product (B-28), a layered product (B-28-1) that had a structure of gas barrier layer/AC/OPET/adhesive/ONy/adhesive/PP was produced by the same method as in Example 23. With respect to this layered product, the neutralization degree after the retort processing and the oxygen transmission rate after the retort processing were measured. The neutralization degree after the retort processing was 90 mol %, while the oxygen transmission rate after the retort processing was lower than 0.2 $cm^3/m^2 \cdot day \cdot atm$. Thus, with respect to the both, the layered product exhibited excellent values.

Example 29

Polyacrylic acid (PAA) with a number average molecular weight of 150,000 was dissolved in distilled water. Thus, a polyacrylic acid aqueous solution was obtained, in which the solid content concentration was 10 wt %.

Next, 68.4 parts by weight of tetramethoxysilane was dissolved in 82.0 parts by weight of methanol. Subsequently, 13.6 parts by weight of gamma-glycidoxypropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that were being stirred. Thus a solution (S29) was obtained. With respect to this solution (S29), the storage stability was evaluated by the method described above.

Next, a layered product (29) that had a structure of gas barrier layer (2 μm)/AC/OPET (12 μm) was produced by the same method as in Example 23 except that the solution (S29) was used instead of the solution (S23). The gas barrier layer of the layered product (29) was transparent and colorless and had a good surface appearance.

Next, the layered product (29) was subjected to the ionization treatment using the calcium acetate aqueous solution (MI-1) under the same conditions as those employed in Example 23. Subsequently, superfluous calcium acetate was washed away with distilled water whose temperature had been adjusted to 80° C. Thereafter, it was dried at 80° C. for five minutes. Thus, a layered product (B-29) of the present invention was obtained. With respect to the layered product (B-29), the neutralization degree of the carboxyl groups of the polyacrylic acid contained in the gas barrier layer was determined by the aforementioned method. As a result, it was proved that 63 mol % of the carboxyl groups had been neutralized by calcium ions. In addition, with respect to the layered product (B-29), the oxygen barrier property, haze, and content of inorganic components were evaluated by the aforementioned methods.

Furthermore, using the layered product (B-29), a layered product (B-29-1) that had a structure of gas barrier layer/AC/OPET/adhesive/ONy/adhesive/PP was produced by the same method as in Example 23. With respect to this layered product, the dropped bag breaking strength, neutralization degree after the retort processing, and oxygen transmission rate after the retort processing were measured. The neutralization degree after the retort processing was 92 mol %, while the oxygen transmission rate after the retort processing was lower than 0.2 cm$^3$/m$^2$·day·atm. Thus, with respect to the both, the layered product exhibited excellent values.

Example 30

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 84.2 parts by weight of tetramethoxysilane (TMOS) was dissolved in 90.8 parts by weight of methanol. Subsequently, 6.60 parts by weight of 3-mercaptopropyltrimethoxysilane was dissolved therein. Thereafter, 5.93 parts by weight of distilled water and 14.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 173 parts by weight of distilled water, which then was added promptly to 625 parts by weight of the above-mentioned 10-wt % polyacrylic acid aqueous solution that were being stirred. Thus a solution (S30) was obtained. With respect to this solution (S30), the storage stability was evaluated by the method described above.

Next, a layered product (30) that had a structure of gas barrier layer (1 μm)/AC (0.1 μm)/OPET (12 μm)/AC (0.1 μm)/gas barrier layer (1 μm) was produced by the same method as in Example 14 except that a different anchor coating agent was used in this example. The gas barrier layers were transparent and colorless and had a good surface appearance. The anchor coating agent used in Example 30 was a two-component anchor coating agent in which a polyol base resin and an aliphatic isocyanate curing agent were used. Takelac A626 (Trade Name) manufactured by Mitsui Takeda Chemicals, Inc. was used as the base resin, while Takenate A50 (Trade Name) manufactured by Mitsui Takeda Chemicals, Inc. was used as the curing agent. The base resin, the curing agent, and ethyl acetate (the moisture contained in ethyl acetate was 520 ppm) were mixed together in such a manner that the weight ratio between the base resin and the curing agent was 4/3 (the base resin/the curing agent).

Next, the layered product (30) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-30) of the present invention was obtained. With respect to the layered product (B-30), the neutralization degree of the carboxyl groups of the polyacrylic acid contained in the gas barrier layers was determined by the aforementioned method. As a result, it was proved that 97 mol % of the carboxyl groups had been neutralized by calcium ions. In addition, with respect to the layered product (B-30), the oxygen barrier property, surface appearance, change in appearance through heating, tensile strength and elongation, haze, and content of inorganic components were evaluated by the aforementioned methods.

Furthermore, using the layered product (B-30), a layered product (B-30-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and the oxygen transmission rate after the retort processing were measured. The ionization degree of the outermost layer after the retort processing was 98 mol %, while the oxygen transmission rate after the retort processing was lower than 0.2 cm$^3$/m$^2$·day·atm. Thus, with respect to the both, the layered product exhibited excellent values.

Example 31

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained, in which the solid content concentration was 10 wt %.

Next, 84.2 parts by weight of tetramethoxysilane (TMOS) was dissolved in 91.1 parts by weight of methanol. Subsequently, 6.90 parts by weight of gamma-isocyanatopropyltrimethoxysilane was dissolved therein. Thereafter, 5.93 parts by weight of distilled water and 14.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 176 parts by weight of distilled water, which then was added promptly to 622 parts by weight of the above-mentioned 10-wt % polyacrylic acid aqueous solution that were being stirred. Thus a solution (S31) was obtained. With respect to this solution (S31), the storage stability was evaluated by the method described above.

Next, a layered product (31) that had a structure of gas barrier layer (1 μm)/AC (0.1 μm)/OPET (12 μm)/AC (0.1 μm)/gas barrier layer (1 μm) was produced by the same method as in Example 14 except that a different anchor coating agent was used in this example. The gas barrier layers were transparent and colorless and had a good surface appearance. The anchor coating agent used in Example 31 was a two-component anchor coating agent in which a polyol base resin and an aliphatic isocyanate curing agent were used. Takelac A626 (Trade Name) manufactured by Mitsui Takeda Chemicals, Inc. was used as the base resin, while Takenate A50 (Trade Name) manufactured by Mitsui Takeda Chemicals, Inc. was used as the curing agent. The base resin, the curing agent, and ethyl acetate (the moisture contained in ethyl acetate was 520 ppm) were mixed together in such a manner that the weight ratio between the base resin and the curing agent was 4/3 (the base resin/the curing agent).

Next, the layered product (31) was subjected to the ionization treatment using the calcium acetate aqueous solution (MI-1) under the same conditions as those employed in Example 1. Subsequently, superfluous calcium acetate was washed away with distilled water whose temperature had been adjusted to 80° C. Thereafter, it was dried at 80° C. for five minutes. Thus, a layered product (B-31) of the present invention was obtained. With respect to the layered product (B-31), the neutralization degree of the carboxyl groups of the polyacrylic acid contained in the gas barrier layers was determined by the aforementioned method. As a result, it was proved that 82 mol % of the carboxyl groups had been neutralized by calcium ions. In addition, with respect to the layered product (B-31), the oxygen barrier property, surface appearance, change in appearance through heating, tensile strength and elongation, haze, and content of inorganic components were evaluated by the aforementioned methods.

Furthermore, using the layered product (B-31), a layered product (B-30-1) that had a structure of gas barrier layer/AC/OPET/AC/gas barrier layer/adhesive/ONy/adhesive/PP was produced by the same method as in Example 1. With respect to this layered product, the dropped bag breaking strength, peel strength, ionization degree after the retort processing, and oxygen transmission rate after the retort processing were measured. The ionization degree of the outermost layer after the retort processing was 97 mol %, while the oxygen transmission rate after the retort processing was lower than 0.2 $cm^3/m^2 \cdot day \cdot atm$. Thus, with respect to the both, the layered product exhibited excellent values.

Tables 5 and 6 indicate the production conditions and evaluation results of the examples described above.

TABLE 5

| Examples | Carboxylic Acid-Containing Polymer | Content of Inorganic Contents [wt %] | Univalent Ion Added Ion Type | Amount [mol %] | Compound (B) Type | Compound (A·A') Type | Added Amount [mol % (*)] | Polyvalent Ion Ion Type | Neutralization Degree |
|---|---|---|---|---|---|---|---|---|---|
| Example 23 | PAA | 30 | $NH_4^+$ | 1.5 | TMOS | a-1 | 10 | $Ca^{2+}$ | 69 |
| Example 24 | PAA | 30 | $NH_4^+$ | 1.5 | TMOS | a-2 | 10 | $Ca^{2+}$ | 86 |
| Example 25 | PAA | 30 | $NH_4^+$ | 1.5 | TMOS | a-3 | 10 | $Ca^{2+}$ | 50 |
| Example 26 | PAA | 30 | $NH_4^+$ | 1.5 | TMOS | a-1 | 20 | $Ca^{2+}$ | 55 |
| Example 27 | PAA | 30 | — | — | TMOS | a-1 | 10 | $Ca^{2+}$ | 69 |
| Example 28 | PAA | 30 | — | — | TMOS | a-2 | 10 | $Ca^{2+}$ | 85 |
| Example 29 | PAA | 30 | — | — | TMOS | b-1 | 10 | $Ca^{2+}$ | 63 |
| Example 30 | PAA | 35 | $NH_4^+$ | 1.5 | TMOS | a-2 | 5 | $Ca^{2+}$ | 97 |
| Example 31 | PAA | 35 | $NH_4^+$ | 1.5 | TMOS | b-2 | 5 | $Ca^{2+}$ | 82 | a-1: 3-chloropropyltrimethoxysilane
a-2: 3-mercaptopropyltrimethoxysilane
a-3: N-(3-triethoxysilylpropyl)gluconamide
b-1: gamma-glycidoxypropyltrimethoxysilane
b-2: gamma-isocyanatopropyltrimethoxysilane
(*) The ratio of Compound (A or A') to the total of Compound (A or A') and Compound (B) [(Compound (A or A'))/(Compound (A or A') + Compound (B))]

TABLE 6

| Examples | Stability of Solution (S) | Haze (%) | Oxygen Transmission Rate ($cm^3/m^2 \cdot day \cdot atm$) Before Retort Processing | After Retort Processing |
|---|---|---|---|---|
| Example 23 | 4 days | 1.5 | 0.2 | 0.2> |
| Example 24 | 4 days | 1.8 | 0.3 | 0.2> |
| Example 25 | 4 days | 2.0 | 0.5 | 0.2> |
| Example 26 | 4 days | 1.2 | 0.5 | 0.2> |
| Example 27 | At least 7 days | 2.0 | 0.2 | 0.2> |
| Example 28 | At least 7 days | 2.4 | 0.3 | 0.2> |
| Example 29 | At least 7 days | 4.8 | 0.2 | 0.2> |
| Example 30 | 4 days | 2.2 | 0.2 | 0.2> |
| Example 31 | 4 days | 4.7 | 0.2 | 0.2> |

As shown in Table 6, the layered products (B-23) to (B-31) of Examples 23 to 31 each exhibited a high oxygen barrier property even under high humidity conditions. The layered products (B-23) to (B28) and (B-30) each had a smaller haze value, which was 3% or less. Accordingly, they were transparent and had a good surface appearance.

Furthermore, as shown in Table 6, the layered products (B-23-1) to (B-31-1) of Examples 23 to 31 each had a high oxygen barrier property even after the retort processing.

Moreover, as shown in Table 6, the solutions (S23) to (S29) each did not gelate even after 2 days and also had an excellent coating property.

In the above, the embodiments of the present invention were described using examples. The present invention, however, is not limited to the above-mentioned embodiments but can be applied to other embodiments according to the technical idea of the present invention.

INDUSTRIAL APPLICABILITY

The present invention is applicable to layered products that are required to have a gas barrier property and methods for producing them. Particularly, the gas barrier layered product of the present invention exhibits a high oxygen barrier property irrespective of humidity. It also exhibits a high oxygen barrier property even after being subjected to the retort processing. Accordingly, the gas barrier layered product of the present invention is used effectively as packaging materials for food, medicine, medical equipment, machine parts, garments, etc. It is used particularly effectively for a food packaging use where the gas barrier property is required under a high humidity condition.

The invention claimed is:

1. A gas barrier layered product comprising a base material and a layer stacked on at least one surface of the base material, wherein the layer is formed of a composition comprising:
   a hydrolyzed and condensed product of at least one compound (L) comprising a metal atom to which at least one characteristic group selected from a halogen atom and an alkoxy group has been bonded; and
   a neutralized product of a polymer comprising at least one functional group selected from a carboxyl group and a carboxylic anhydride group, wherein at least 55 mol % of a —COO— group contained in the at least one functional group has been neutralized with a metal ion having a valence of two or more,
   wherein the compound (L) comprises at least one compound (A) represented by the following chemical formula (I) and at least one compound (B) represented by the following chemical formula (II):

  (I)

wherein $M^1$ is Si, Al, Ti, Zr, Cu, Ca, Sr, Ba, Zn, B, Ga, Y, Ge, Pb, P, Sb, V, Ta, W, La, or Nd; $R^1$ is an alkyl group; $X^1$ is a halogen atom; $Z^1$ is an alkyl group substituted by a functional group having reactivity to a carboxyl group; m is equal to a valence of $M^1$; n is an integer of 0 to (m−1); k is an integer of 0 to (m−1); and $1 \leq n+k \leq (m-1)$,

  (II)

wherein $M^2$ is Si, Al, Ti, Zr, Cu, Ca, Sr, Ba, Zn, B, Ga, Y, Ge, Pb, P, Sb, V, Ta, W, La, or Nd; $R^2$ is an alkyl group; $R^3$ is an alkyl group, an aralkyl group, an aryl group, or an alkenyl group; $X^2$ is a halogen atom; p is equal to a valence of $M^2$; q is an integer of 0 to p; r is an integer of 0 to p; and $1 \leq q+r \leq p$, and
   wherein a mole ratio of the compound (A)/the compound (B) is in a range of 0.5/99.5 to 40/60.

2. The gas barrier layered product according to claim 1, wherein in the chemical formula (I), the functional group having reactivity to a carboxyl group is at least one selected from the group consisting of an epoxy group, an amino group, a hydroxyl group, a halogen atom, a mercapto group, an isocyanate group, a ureide group, an oxazoline group, and a carbodiimide group.

3. The gas barrier layered product according to claim 2, wherein in the chemical formula (I), the functional group having reactivity to a carboxyl group is at least one selected from the group consisting of an epoxy group, an amino group, and an isocyanate group.

4. The gas barrier layered product according to claim 1, wherein in the chemical formula (I), $M^1$ is Si, Al, Ti, or Zr; and wherein in the chemical formula (II), $M^2$ is Si, Al, Ti, or Zr.

5. The gas barrier layered product according to claim 1, wherein the compound (A) is at least one compound selected from the group consisting of gamma-glycidoxypropyltrimethoxysilane, gamma-glycidoxypropyltriethoxysilane, gamma-glycidoxypropyltrichlorosilane, gamma-aminopropyltrimethoxysilane, gamma-aminopropyltriethoxysilane, gamma-aminopropyltrichlorosilane, gamma-chloropropyltrimethoxysilane, gamma-chloropropyltriethoxysilane, gamma-chloropropyltrichlorosilane, gamma-bromopropyltrimethoxysilane, gamma-bromopropyltriethoxysilane, gamma-bromopropyltrichlorosilane, gamma-mercaptopropyltrimethoxysilane, gamma-mercaptopropyltriethoxysilane, gamma-mercaptopropyltrichlorosilane, gamma-isocyanatopropyltrimethoxysilane, gamma-isocyanatopropyltriethoxysilane, gamma-isocyanatopropyltrichlorosilane, gamma-ureidopropyltrimethoxysilane, gamma-ureidopropyltriethoxysilane, and gamma-ureidopropyltrichlorosilane.

6. The gas barrier layered product according to claim 1, wherein the gas barrier layered product has an oxygen transmission rate of 1.0 $cm^3/m^2 \cdot day \cdot atm$ or lower in an atmosphere of 20° C. and 85% RH.

7. The gas barrier layered product according to claim 1, wherein the content of an inorganic component contained in the composition is 5 to 50 wt %.

8. The gas barrier layered product according to claim 1, wherein the polymer is at least one polymer selected from polyacrylic acid and polymethacrylic acid.

9. The gas barrier layered product according to claim 1, wherein the metal ion is at least one selected from the group consisting of a calcium ion, a magnesium ion, a barium ion, and a zinc ion.

10. The gas barrier layered product according to claim 1, wherein the composition further comprises polyalcohols.

11. The gas barrier layered product according to claim 10, wherein a weight ratio of the neutralized product/the polyalcohols is 10/90 to 99.5/0.5.

12. The gas barrier layered product according to claim 1, further comprising an adhesive layer disposed between the base material and the layer.

13. The gas barrier layered product according to claim 1, wherein the base material comprises a paper layer.

14. The gas barrier layered product according to claim 1, wherein a mole ratio of the compound (A)/the compound (B) is in a range of 3/97 to 40/60.

15. The gas barrier layered product according to claim 1, wherein the layer has a sea-island structure containing a sea phase (P) and an island phase (Q).

16. The gas barrier layered product according to claim 15, wherein
   the sea phase (P) has a sea-island structure composed of: a sea phase (P1) predominantly comprising the neutralized product of the polymer; and an island phase (P2) predominantly comprising the hydrolyzed and condensed product of the compound (L), and
   the island phase (Q) has a sea-island structure composed of: a sea phase (Q1) predominantly comprising the neutralized product of the polymer; and an island phase (Q2) predominantly comprising the hydrolyzed and condensed product of the compound (L).

17. A packaging medium comprising a gas barrier layered product according to claim 1.

18. The packaging medium according to claim 17, wherein a base material included in the gas barrier layered product comprises a paper layer.

19. A method for producing a gas barrier layered product, comprising:
- a first process of forming, on a base material, a layer composed of a composition comprising:
- a hydrolyzed and condensed product of at least one compound (L) comprising a metal atom to which at least one characteristic group selected from a halogen atom and an alkoxy group has been bonded; and
- a polymer comprising at least one functional group selected from a carboxyl group and a carboxylic anhydride group; and
- a second process of bringing the layer into contact with a solution comprising a metal ion with a valence of two or more, wherein at least 55 mol % of a —COO— group contained in the at least one functional group is neutralized with the metal ion having a valence of two or more,
wherein the compound (L) comprises at least one compound (A) represented by the following chemical formula (I) and at least one compound (B) represented by the following chemical formula (II):

$$M^1(OR^1)_n X^1_k Z^1_{m-n-k} \quad (I)$$

wherein $M^1$ is Si, Al, Ti, Zr, Cu, Ca, Sr, Ba, Zn, B, Ga, Y, Ge, Pb, P, Sb, V, Ta, W, La, or Nd; $R^1$ is an alkyl group; $X^1$ is a halogen atom; $Z^1$ is an alkyl group substituted by a functional group having reactivity to a carboxyl group; m is equal to a valence of $M^1$; n is an integer of 0 to (m−1); k is an integer of 0 to (m−1); and $1 \leq n+k \leq (m-1)$,

$$M^2(OR^2)_q R^3_{p-q-r} X^2_r \quad (II)$$

wherein $M^2$ is Si, Al, Ti, Zr, Cu, Ca, Sr, Ba, Zn, B, Ga, Y, Ge, Pb, P, Sb, V, Ta, W, La, or Nd; $R^2$ is an alkyl group; $R^3$ is an alkyl group, an aralkyl group, an aryl group, or an alkenyl group; $X^2$ is a halogen atom; p is equal to a valence of $M^2$; q is an integer of 0 to p; r is an integer of 0 to p; and $1 \leq q+r \leq p$, and wherein a mole ratio of the compound (A)/the compound (B) is in a range of 0.5/99.5 to 40/60.

20. The production method according to claim 19, further comprising:
- a process of preparing a solution (S) comprising the polymer and at least one compound comprising a metallic element selected from the group consisting of the compound (L), a partial hydrolysate of the compound (L), a total hydrolysate of the compound (L), a partial hydrolyzed and condensed product of the compound (L), and a product obtained through condensation of a part of a total hydrolysate of the compound (L); and
- a process of forming the layer by applying the solution (S) to the base material and then drying it.

21. The production method according to claim 19, wherein the first process comprises:
- a process of forming the hydrolyzed and condensed product of the compound (L);
- a process of preparing a solution (S) comprising the polymer and the hydrolyzed and condensed product of the compound (L); and
- a process of forming the layer by applying the solution (S) to the base material and then drying it.

22. The production method according to claim 20, wherein in the polymer contained in the solution (S), 0.1 to 10 mol % of a —COO— group contained in the at least one functional group has been neutralized with a univalent ion.

23. The production method according to claim 19, further comprising a process of heat-treating the layer at a temperature of 120 to 240° C., after the first process and before and/or after the second process.

24. The production method according to claim 19, wherein a mole ratio of the compound (A)/the compound (B) is in a range of 3/97 to 40/60.

* * * * *